US012424059B2

(12) United States Patent
Gaar

(10) Patent No.: US 12,424,059 B2
(45) Date of Patent: Sep. 23, 2025

(54) RANDOM QUANTITY OF WAYS TO WIN DETERMINING MODIFIER OF HOLD AND SPIN SEQUENCE

(71) Applicant: IGT, Las Vegas, NV (US)

(72) Inventor: Klaus Gaar, Aflenz Kurort (AT)

(73) Assignee: IGT, Las Vegas, NV (US)

( * ) Notice: Subject to any disclaimer, the term of this patent is extended or adjusted under 35 U.S.C. 154(b) by 353 days.

(21) Appl. No.: 17/978,714

(22) Filed: Nov. 1, 2022

(65) Prior Publication Data

US 2024/0144785 A1 May 2, 2024

(51) Int. Cl.
*G07F 17/32* (2006.01)

(52) U.S. Cl.
CPC ...... *G07F 17/3267* (2013.01); *G07F 17/3213* (2013.01)

(58) Field of Classification Search
CPC ............. G07F 17/3267; G07F 17/3213; G07F 17/326; G07F 17/3262
USPC .............................................................. 463/31
See application file for complete search history.

(56) References Cited

U.S. PATENT DOCUMENTS 6,572,471 B1 6/2003 Bennett
7,192,347 B1 3/2007 Marks et al.
7,654,895 B2 2/2010 Pacey
7,922,573 B2 4/2011 Baerlocher et al.
8,177,620 B2 * 5/2012 Miles ...................... G07F 17/32 463/16
8,241,104 B2 8/2012 Wolf
8,267,777 B2 9/2012 Jaffe
8,328,636 B2 12/2012 Jaffe et al.
8,360,851 B2 1/2013 Aoki et al.
8,408,993 B2 4/2013 Lafky et al.
8,556,708 B2 10/2013 Poole et al.
8,562,416 B2 10/2013 Baerlocher et al.
8,602,868 B2 * 12/2013 Johnson .............. G07F 17/3213 463/20
9,138,634 B2 * 9/2015 Moody ............... G07F 17/3244
9,208,651 B2 12/2015 Jaffe
9,245,407 B2 1/2016 Saunders et al.
9,430,906 B2 * 8/2016 Aoki ..................... G07F 17/326
9,472,058 B2 10/2016 Hornik et al.
9,640,024 B2 5/2017 Hornik
9,704,352 B2 7/2017 Robbins et al.
9,824,526 B2 11/2017 Hughes et al.
10,223,861 B2 3/2019 Marks et al.
10,255,752 B2 4/2019 Singer et al.
(Continued)

OTHER PUBLICATIONS

All Megaways Slots Ever Releases, The Complete List 2021 Article [online] [retrieved on Sep. 20, 2021]. Retrieved from the Internet at <URL: https://www.bigwinboard.com/megaways-slots/>.
(Continued)

*Primary Examiner* — Allen Chan
(74) *Attorney, Agent, or Firm* — Neal, Gerber & Eisenberg LLP

(57) ABSTRACT

Gaming systems and methods that randomly determine a quantity of ways to win for a play of a game by randomly determining a quantity of active symbol display positions to employ for that play of the game and then, responsive to a triggering event, utilize the randomly determined quantity of active symbol display positions to determine one or more modifiers employed for a symbol accumulation sequence.

20 Claims, 13 Drawing Sheets

(56) References Cited

U.S. PATENT DOCUMENTS

| | | | | |
|---|---|---|---|---|
| 10,380,831 | B2 | 8/2019 | Wotton et al. | |
| 10,380,848 | B2 | 8/2019 | Rodgers | |
| 10,867,469 | B2 | 12/2020 | Ceniceroz et al. | |
| 10,997,823 | B2 | 5/2021 | Marks et al. | |
| 11,263,862 | B2 * | 3/2022 | Boese | G07F 17/3244 |
| 11,625,982 | B2 * | 4/2023 | La Guardia | G07F 17/3209 463/20 |
| 11,954,977 | B2 * | 4/2024 | DeBrabander | G07F 17/3213 |
| 12,125,347 | B2 * | 10/2024 | Peterson | G07F 17/3255 |
| 2006/0030387 | A1 | 2/2006 | Jackson | |
| 2015/0080094 | A1 | 3/2015 | Edwards | |
| 2018/0218563 | A1 | 8/2018 | Twomey et al. | |
| 2020/0051381 | A1 | 2/2020 | Tam et al. | |
| 2020/0202671 | A1 | 6/2020 | Halvorson | |
| 2020/0250923 | A1 | 8/2020 | Ceniceroz et al. | |
| 2020/0265680 | A1 | 8/2020 | Chan et al. | |
| 2021/0110636 | A1 | 4/2021 | Halvorson et al. | |
| 2023/0035244 | A1 * | 2/2023 | Penacho | G07F 17/3211 |

OTHER PUBLICATIONS

Bonanza Megapays (Big Time Gaming) Slot Review and Demo Article [online] [retrieved on Sep. 20, 2021]. Retrieved from the Internet at <URL: https://www.bigwinboard.com/bonanza-megapays-big-time-gaming-slot-review/>.

Gold Megaways (Big Time Gaming) Slot Review and Demo Article [online] [retrieved on Sep. 20, 2021]. Retrieved from the Internet at <URL: https://www.bigwinboard.com/gold-megaways-big-time-gaming-slot-review/>.

Wheel of Fortune Megaways (Big Time Gaming) Slot Review and Demo Article [online] [retrieved on Sep. 20, 2021]. Retrieved from the Internet at <URL: https://www.bigwinboard.com/wheel-of-fortune-big-time-gaming-slot-review/>.

* cited by examiner

1000

RANDOM QUANTITY OF WAYS TO WIN DETERMINING MODIFIER OF HOLD AND SPIN SEQUENCE

BACKGROUND

In various embodiments, the systems and methods of the present disclosure randomly determine a quantity of ways to win for a play of a game by randomly determining a quantity of active symbol display positions to employ for that play of the game and then, responsive to a triggering event, utilize the randomly determined quantity of active symbol display positions to determine one or more modifiers employed for a symbol accumulation sequence.

Gaming machines may provide players awards in primary games. Gaming machines generally require the player to place or make a wager to activate the primary or base game. The award may be based on the player obtaining a winning symbol or symbol combination and on the amount of the wager.

BRIEF SUMMARY

In certain embodiments, the present disclosure relates to a gaming system including a processor, and a memory device that stores a plurality of instructions. When executed by the processor for a play of a first game, the instructions cause the processor to randomly determine a quantity of symbol display positions associated with a plurality of reels, determine, based on a ways to win symbol evaluation, any awards associated with any displayed symbol combinations including symbols displayed at the randomly determined quantity of symbol display positions, and cause a display, by the display device, of any determined awards associated with any displayed symbol combinations. When executed by the processor for a play of a second game, the instructions cause the processor to assign a modifier to a first reel of the plurality of reels, the modifier being based on the randomly determined quantity of symbol display positions associated with that first reel. When executed by the processor responsive to an occurrence of a symbol modification event associated with any accumulated symbols displayed at any of the random quantity of symbol display positions associated with the first reel, the instructions cause the processor to modify, based on the modifier assigned to the first reel, any awards associated with any accumulated symbols displayed at any of the random quantity of symbol display positions associated with the first reel. When executed by the processor, the instructions cause the processor to cause a display, by the display device, of any modified awards associated with any accumulated symbols.

In certain embodiments, the present disclosure relates to a gaming system including a processor, and a memory device that stores a plurality of instructions. When executed by the processor, the instructions cause the processor to randomly determine a quantity of symbol display positions associated with a reel. When executed by the processor for a play of a first game prior to an occurrence of a symbol accumulation sequence triggering event, the instructions cause the processor to determine a first award based on first symbols displayed at the random quantity of symbol display positions associated with the reel, and cause a display, by a display device, of the first award. When executed by the processor for a play of a second game after the occurrence of the symbol accumulation sequence triggering event, the instructions cause the processor to determine a second award based, at least in part, on an accumulation of second symbols at the randomly determined quantity of symbol display positions associated with the reel and a modifier based on the randomly determined quantity of symbol display positions associated with the reel, and cause a display, by the display device, of the second award.

In certain embodiments, the present disclosure relates to a gaming system including a processor, and a memory device that stores a plurality of instructions. When executed by the processor in association with a sequence including a plurality of plays of a game, the instructions cause the processor to cause a display, by a display device, of a symbol accumulated at a symbol display position associated with a reel, the symbol display position being one of a randomly determined quantity of symbol display positions associated with a plurality of reels, and an award associated with the symbol accumulated at the symbol display position. When executed by the processor responsive to an occurrence of a symbol modification event associated with the symbol accumulated at the symbol display position, the instructions cause the processor to modify the award associated with the symbol based on a modifier assigned to the reel associated with that symbol display position, the modifier being based on the randomly determined quantity of symbol display positions associated with that reel, and cause a display, by the display device, of the modified award associated with the symbol accumulated at that symbol display position.

Additional features are described herein, and will be apparent from the following Detailed Description and the figures.

DETAILED DESCRIPTION

Figure 1A:
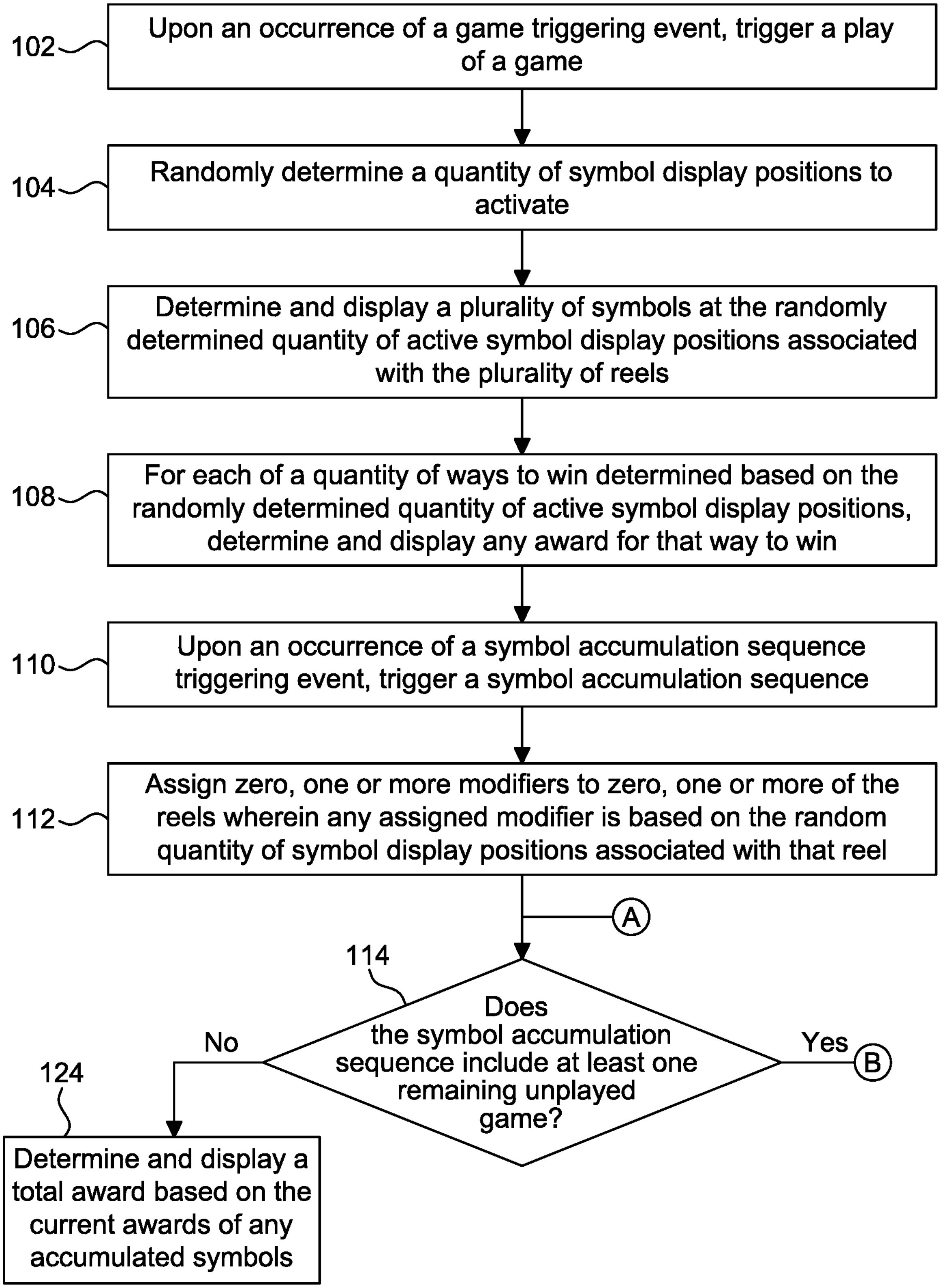
FIGS. 1A and 1B (collectively FIG. 1) are a flow chart of an example process for operating a gaming system which randomly determines a quantity of active symbol display positions to employ for a play of a first game and utilizes the randomly determined quantity of active symbol display positions to determine one or more modifiers for one or more plays of a second game.

In various embodiments, the present disclosure relates generally to gaming systems and methods that randomly determine a quantity of ways to win for a play of a game by randomly determining a quantity of active symbol display positions to employ for that play of the game and then, responsive to a triggering event, utilize the randomly determined quantity of active symbol display positions to determine one or more modifiers employed for a symbol accumulation sequence.

In certain embodiments, the gaming system randomly determines, for each play of each game, a quantity of symbol display positions to associate with each of a plurality of reels. In these embodiments, upon an occurrence of a game triggering event, the gaming system randomly determines, for each reel, a quantity of symbol display positions to employ or otherwise activate for that reel such that the collection of randomly determined quantity of symbol display positions across the plurality of reels form a matrix of symbol display positions. Such a dynamic matrix of symbol display positions changes from game to game based on the random determinations of how many symbol display positions to associate with each reel for each game.

Following the determination of a quantity of symbol display positions to employ or otherwise activate for the triggered play of the game, the gaming system randomly determines a symbol to display at each of the activate symbol display positions. In these embodiments, different quantities of active symbol display positions result in different quantities of randomly determined symbols that may or may not be included in the formation of any winning symbol combination associated with any award.

Following the display of a symbol at each of the randomly determined quantity of activate symbol display positions, the gaming system evaluates the displayed symbols utilizing a ways to win evaluation, wherein any determined award is based on the number of associated symbols which are displayed at active symbol display positions over a requisite number of adjacent reels. In these embodiments, rather than determining any awards based on any paylines that would have passed through a displayed winning symbol combination, the gaming system determines zero, one or more awards based on a number of ways to win formed.

Accordingly, since different plays of the game will result in different quantities of symbol display positions being employed and since different quantities of symbol display positions are associated with different quantities of randomly determined symbols, the gaming system of the present disclosure employs different maximum quantities of ways to win for different plays of the game. For example, while the random selection of three active symbol display positions in association with each of six reels will result in a play of a game with 729 possible ways to win, the random selection of seven active symbol display positions in association with each of six reels will result in a play of a game with 117,649 possible ways to win. As seen by this example, the greater the quantity of symbol display positions randomly activated in association with a play of a game, the greater the quantity of ways to win (and possible awards associated with winning symbol combinations formed) for the play of the game.

Such a configuration of varying the quantity of symbols displayed in association with the reels from game to game (for the same wager amount placed) results in different opportunities (in the form of possible winning ways to win) from game to game (for the same wager amount placed). In other words, since the greater the quantity of displayed symbols theoretically corresponds to a greater probability of certain of such displayed symbols forming one or more winning ways, the gaming system randomly varying the quantities of displayed symbols from play to play of a game varies the probabilities of winning any awards from play to play of that game. Such variance alters the volatility of the gaming system from play to play of a game, wherein the volatility is determined, at least in part, based on one or more random determinations (of the quantity of activated symbol display positions) that occur prior to any random determination of any symbols. As such, not only does the gaming system employ one or more random determinations to control the number of possible ways to win (i.e., possible strings of related symbols which may be classified), but in doing so, the gaming system employs such random determinations to determine an operational mode of the gaming system (i.e., the more randomly determined active symbol display positions, the more possible ways to win available and the greater the average expected payback of that operational mode of the gaming system).

In addition to employing random quantities of symbol display positions to employ or otherwise activate in association with each reel for a play of a game, if a symbol accumulation sequence triggering event occurs in association with the play of the game, the gaming system triggers a symbol accumulation sequence and determines a modifier to associate with each reel. The modifier associated with each reel corresponds to the random quantity of symbol display positions activated in association with that reel. For example, a first reel associated with a random quantity of four symbol display positions is associated with a multiplier of 4× and a second reel associated with a random quantity of seven symbol display positions is associated with a multiplier of 7×. As such, since different plays of the game will result in different quantities of symbol display positions being employed and since, upon an occurrence of a symbol accumulation sequence triggering event, different quantities of symbol display positions are associated with different modifiers for the triggered symbol accumulation sequence, the gaming system of the present disclosure employs different modifiers for different triggers of the symbol accumulation sequence.

Following the determination of a modifier to associated with each reel, for each play of a game of the triggered sequence, the gaming system randomly determines and displays zero, one or more symbols at zero, one or more available symbol display positions. Zero, one or more displayed symbols are each associated with an award. For each randomly determined and displayed symbol at each symbol display position, the gaming system accumulates that symbol in association with that symbol display position. Once accumulated in association with a symbol display position, that accumulated symbol remains associated with that symbol display position for the duration of the triggered sequence such that a symbol display position associated with an accumulated symbol from one play of the game of the triggered sequence is unavailable to display another symbol for another play of the game of the triggered sequence. In other words, an accumulated symbol persists at a symbol display position over one or more plays of the game of the triggered sequence.

In addition to accumulating zero, one or more symbols at zero, one or more symbol display positions over one or more plays of the game of the triggered sequence, the gaming system determines whether to modify any awards associated with zero, one or more symbols accumulated at zero, one or more symbol display positions. In these embodiments, upon an occurrence of an symbol modification event, such as upon a determination that a symbol is accumulated at each of the random quantity of symbol display positions associated with a reel, the gaming system modifies zero, one or more awards of such symbols based on the modifier associated with that reel. Continuing with the above example, if the gaming system determines that symbols are accumulated at each of the random quantity of four symbol display positions associated with the first reel, the gaming system modifies the awards associated with these symbols by the associated multiplier of 4×. In this example, if the gaming system additionally or alternatively determines that symbols are accumulated at each of the random quantity of seven symbol display positions associated with the second reel, the gaming system modifies the awards associated with these symbols by the associated multiplier of 7×. As such, if the gaming system determines to modify the award of an accumulated symbol, the gaming system employs the modifier associated with the reel at which the accumulated symbol is displayed at a symbol display position associated with, wherein the associated modifier is based on the random quantity of symbol display positions associated with that reel. Such a configuration introduces an additional avenue to modify the volatility of the gaming system, thereby altering the operation of the gaming system by employing one or more additional determinations to alter the frequency by which awards may be modified. In other words, since a relatively lower random quantity of symbol display positions associated with a reel is associated with a relatively lower modifier but a relatively higher probability of a symbol being accumulated at each of the symbol display positions (to cause a modification of the awards associated with such symbols), and since a relatively higher random quantity of symbol display positions associated with a reel is associated with a relatively higher modifier but a relatively lower probability of a symbol being accumulated at each of the symbol display positions (to cause a modification of the awards associated with such symbols), the gaming system offers an additional avenue to vary the volatility from symbol accumulation sequence to symbol accumulation sequence.

It should be appreciated that, in various embodiments, since a symbol previously accumulated at a symbol display position prevents other symbols from being displayed at (and thus accumulated at) that symbol display position, the quantity of symbol display positions available to potentially display symbols at decreases with each accumulated symbol. As such, the random quantity of symbol display positions to associate with each reel (which then persists or carries over into the triggered symbol accumulation sequence) determines the initial quantity of available symbol display positions which decreases with each accumulated symbol. Put differently, the greater the initial quantity of available symbol display positions (based on the greater results of one or more random determinations of such quantities), the more symbols may be accumulated during the triggered symbol accumulation sequence and the greater the quantity of potential awards realized.

It should be further appreciated that, in various embodiments, since each available symbol display position is an opportunity to accumulate an additional symbol associated with an additional award, the probability of accumulating additional symbols (and thus obtaining additional awards based on these symbol accumulations) decreases with each accumulated symbol. In view of the probability of obtaining additional awards decreasing as more and more symbols are accumulated, the gaming system employs the potential modifications of one or more awards associated with one or more accumulated symbols to combat the occurrences of the displayed awards of the accumulated symbols being relatively low value awards. That is, even if the initial awards of the accumulated symbols are relatively low value awards and even if the chances of accumulating additional symbols diminishes with each additional accumulated symbol, the modifications of awards of accumulated symbols (which is based on the accumulation of symbols at each symbol display position of a reel) provides that such initial awards do not unnecessarily cap the total award available to be won from a triggered sequence.

While certain embodiments described below are directed to randomly determining a quantity of symbol display positions to activate in association with one or more plays of a primary game, such as a wagering game, it should be appreciated that such embodiments may additionally or alternatively be employed in association with randomly determining a quantity of symbol display positions to activate in association with one or more plays of a secondary game, such as a bonus game. Additionally, while certain embodiments described below are directed to accumulating symbols at the randomly determined quantity of activated symbol display positions in association with one or more plays of a secondary game, it should be appreciated that such embodiments may additionally or alternatively be employed in association with accumulating symbols at the randomly determined quantity of activated symbol display positions in association with one or more plays of a primary game.

Moreover, while certain embodiments described below are directed to randomly determining a quantity of symbol display positions to activate, it should be appreciated that in additional or alternative embodiments, the gaming system randomly determines a quantity of symbol display positions to deactivate. Additionally, while certain embodiments described below are directed to accumulating symbols at zero, one or more of a random quantity of symbol display positions associated with a plurality of reels, it should be appreciated that in additional or alternative embodiments, the gaming system redeems or otherwise removes zero, one or more symbols accumulated at zero, one or more of a random quantity of symbol display positions associated with a plurality of reels. Furthermore, while certain embodiments described below are directed to randomly determining a quantity of symbol display positions to activate and then accumulating symbols at such symbol display positions in association with a plurality of reels, it should be appreciated that such embodiments may additionally or alternatively be employed in association with randomly determining a quantity of different game element display positions to activate and then accumulating different game elements at such game element display positions, such as, but not limited to, randomly determining a quantity of playing card display positions to activate and then accumulating playing cards at such playing card display positions, randomly determining a quantity of keno number display positions to activate and then accumulating keno numbers at such keno number display positions, or randomly determining a quantity of bingo number display positions to activate and then accumulating bingo numbers at such bingo number display positions.

While certain embodiments described below are directed to the gaming system randomly determining a quantity of symbol display positions to activate and then accumulating symbols at such symbol display positions that are displayed by an electronic gaming machine ("EGM") such as a slot machine, a video poker machine, a video lottery terminal, a terminal associated with an electronic table game, a terminal associated with a live table game, a video keno machine, a video bingo machine and/or a sports betting terminal that offers sports betting opportunities, it should be appreciated that such embodiments may additionally or alternatively be employed in association with the gaming system randomly determining a quantity of symbol display positions to activate and then accumulating symbols at such symbol display positions that are displayed by a personal gaming device (such as desktop computers, laptop computers, tablet computers or computing devices, personal digital assistants, mobile phones, and other mobile computing devices that offer plays of wagering games (and in certain instances, sports betting opportunities)), any suitable slot machine interface board which is in communication with an EGM, and/or any suitable combination of a server operating with an EGM, a slot machine interface board of an EGM and/or a personal gaming device.

Figure 1B:
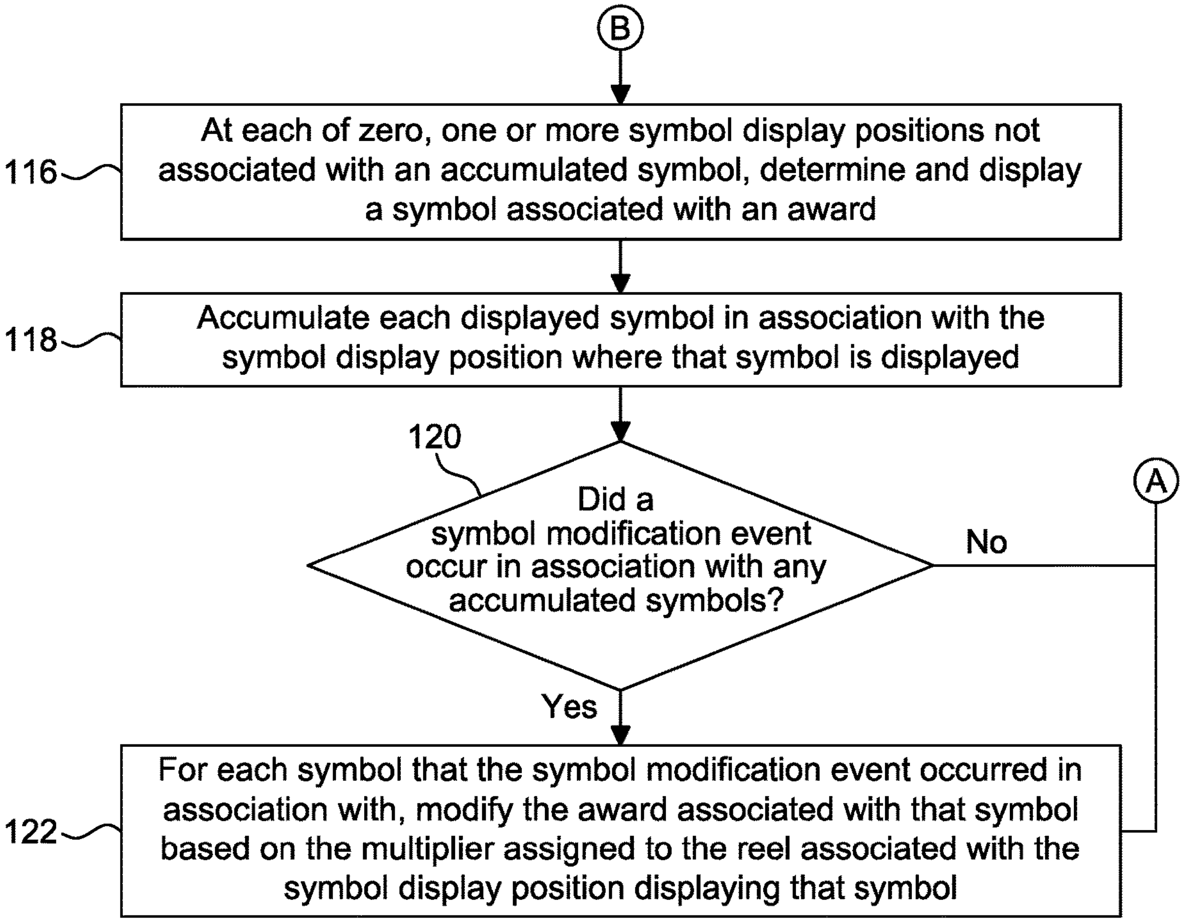

FIG. 1 is a flowchart of an example process or method of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In various embodiments, upon an occurrence of a game triggering event, the gaming system triggers a play of a game as indicated in block 102. In certain embodiments, the game comprises a primary game, such as a primary wagering game, wherein the game triggering event includes the placement of a wager on the play of the primary game. In another embodiment, the game comprises a secondary game, such as a free spin game, wherein the game triggering event occurs based on a displayed event associated with a play of a primary game. In another embodiment wherein the game comprises a secondary game, such as a free spin game, the game triggering event occurs based on an event independent of any displayed event associated with the play of the primary game.

Figure 2A:
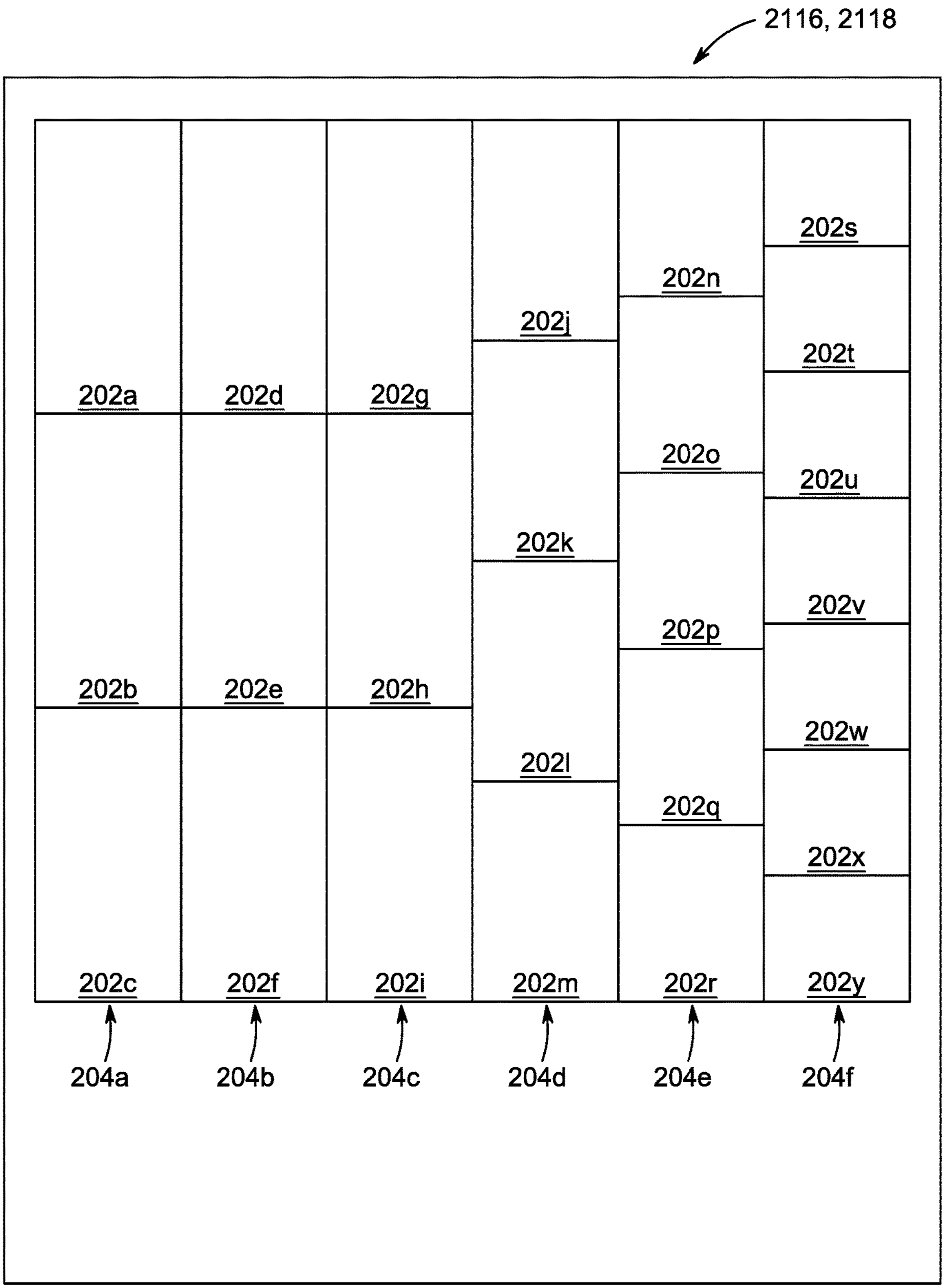
FIGS. 2A, 2B, 2C, 2D, 2E, 2F, and 2G are front views of one embodiment of the gaming system of the present disclosure illustrating a play of a first game with a randomly determined quantity of active symbol display positions and a plurality of plays of a second game of a symbol accumulation sequence that utilizes the randomly determined quantity of active symbol display positions to determine one or more modifiers.

For the triggered play of the game, the gaming system randomly determines a quantity of symbol display positions to activate as indicated in block 104. For example, as seen in FIG. 2A, the gaming system randomly determines a quantity of active symbol display positions 202*a* to 202*y* associated with a plurality of reels 204*a* to 204*f*. As seen in this example, the gaming system randomly determined that certain reels, such as reel 204*c*, 204*d*, 204*e* and 204*f*, are associated with different quantities of active symbol display positions and certain reels, such as reel 204*a*, 204*b*, and 204*c*, are associated with the same quantity of active symbol display positions. It should be appreciated that while displayed as a symbol display position matrix including a variable quantity of symbol display positions over six reels, any suitable configuration of a variable quantity of symbol display positions over any quantity of two or more reels may be utilized for the triggered play of the game.

In certain embodiments, the gaming system randomly determines, for each reel of a plurality of reels, a quantity of symbol display positions to activate in association with the reel. In certain embodiments, the gaming system randomly determines, for a group of less than all of the reels, a quantity of symbol display positions to activate in association with the group of reels. In certain embodiments, the gaming system randomly determines a quantity of symbol display positions to activate in association with the plurality of reels. In these embodiments, rather than determining, reel-by-reel, a quantity of symbol display positions to activate per reel, the gaming system randomly determines a total quantity of symbol display positions to activate and then assigns such a total quantity of symbol display positions to activate across the plurality of reels.

In certain embodiments, each reel of a plurality of reels are associated with a minimum quantity of symbol display positions to activate in association with that reel and/or a maximum quantity of symbol display positions to activate in association with that reel. For example, if each reel of a set of six reels is associated with a minimum quantity of three symbol display positions that may be activated in association with that reel, then the minimum quantity of possible ways to win (as determined based on a quantity of active symbol display positions) over the six reels is 729 possible ways to win. In this example, if each reel of the set of six reels is also associated with a maximum quantity of seven symbol display positions that may be activated in association with that reel, then the maximum quantity of possible ways to win (as determined based on a quantity of active symbol display positions) over the six reels is 117,649 possible ways to win. In certain embodiments, each of the reels of the plurality of reels are associated with the same minimum quantity of symbol display positions to activate in association with that reel and/or the same maximum quantity of symbol display positions to activate in association with that reel. In certain embodiments, two or more of the reels of the plurality of reels are each associated with different minimum quantities of symbol display positions to activate in association with that reel and/or different maximum quantities of symbol display positions to activate in association with that reel. In certain embodiments, each of the reels are associated with different minimum quantities of symbol display positions to activate in association with that reel and/or different maximum quantities of symbol display positions to activate in association with that reel.

In certain embodiments, the gaming system utilizes, for each reel, a weighted table of quantities of symbol display positions to activate, wherein the gaming system randomly selects, from the weighted table for that reel, the quantity of symbol display positions to activate. In certain such embodiments, the gaming system employs the same weighted table for each reel. In certain other embodiments, the gaming system employs different weighted tables for two or more reels, such that different reels have different probabilities of activating different quantities of symbol display positions.

In certain embodiments, the gaming system accounts for the amount of the wager placed on the play of the game in determining the quantity of symbol display positions to activate. In certain embodiments, different wager amounts placed are associated with different probabilities of different quantities of activated symbol display positions. For example, the greater the amount of the wager placed on the play of the game, the greater the chances that a relatively greater quantity of symbol display positions will be activated for that play of the game. In certain such embodiments, the gaming system utilizes different weighted tables of quantities of symbol display positions to activate based on the amount of the wager placed on the play of the game.

In certain embodiments, the gaming system accounts for a player tracking status of a player playing the game in determining the quantity of symbol display positions to activate. In certain embodiments, different player tracking statuses are associated with different probabilities of different quantities of activated symbol display positions. For example, the higher the player tracking status of a player, the greater the chances that a relatively greater quantity of symbol display positions will be activated for that play of the game. In certain such embodiments, the gaming system utilizes different weighted tables of quantities of symbol display positions to activate based on the player tracking status of the player playing the game.

In certain embodiments, one or more of the reels are each associated with a plurality of symbol display positions and a single reel strip. In these embodiments, the display of one symbol of such a dependent reel is based on the position and the display of other symbols of the single reel strip. In certain embodiments, one or more of the reels are each associated with a single symbol display position and a single reel strip. That is, one or more of the reels are independent reels or unisymbol reels that each generate and display one symbol. In these embodiments, since each independent reel displays a single symbol at a single symbol display position, the determination of the quantity of active symbol display positions includes the determination of a quantity of independent reels to each display a symbol at a symbol display position. For example, to determine a quantity of active symbol display positions, the gaming system determines, reel column-by-reel column, a quantity of independent reels to associate with each reel column.

Figure 2B:
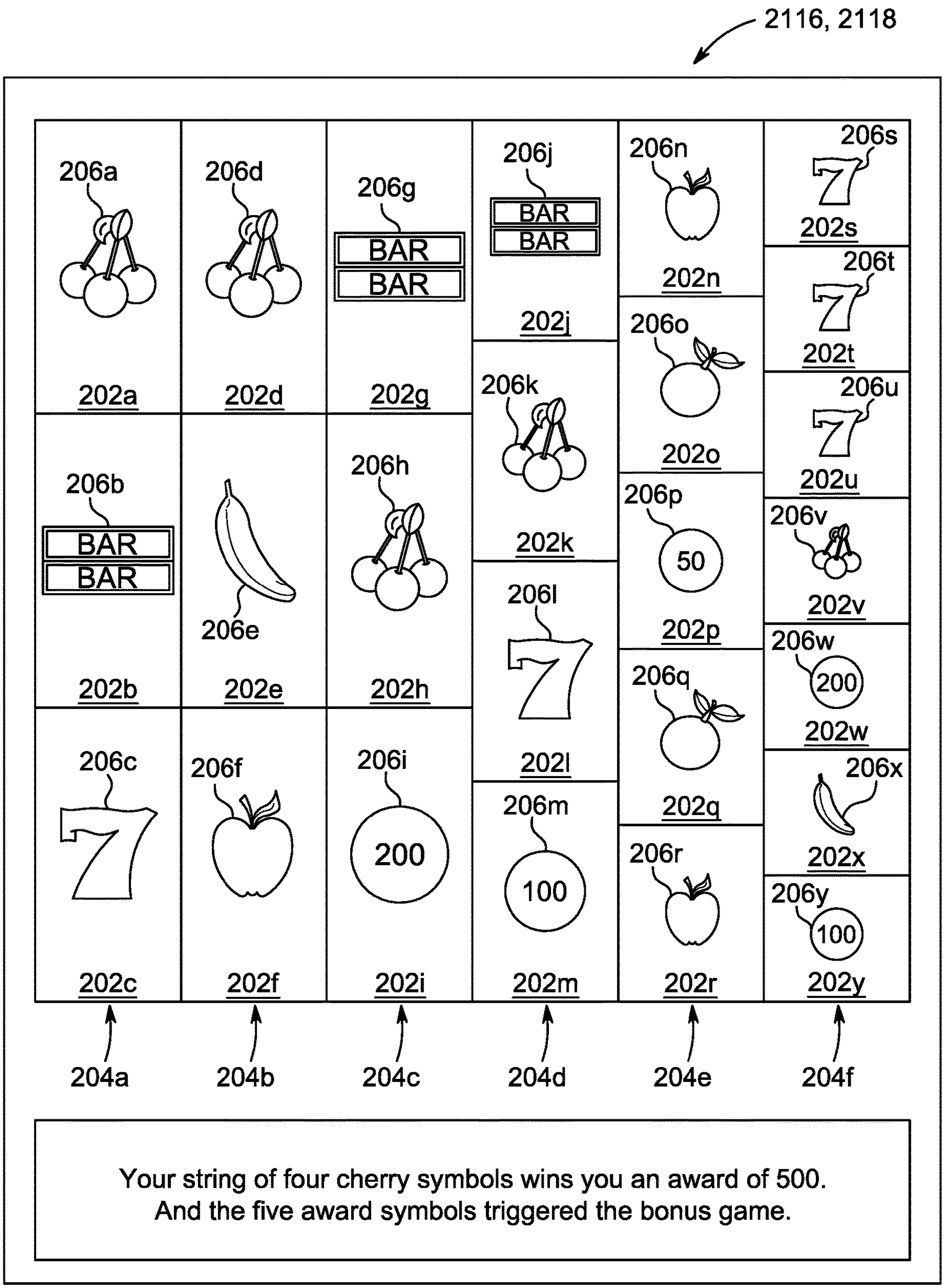

Following the random determination of a quantity of symbol display positions to activate for the triggered play of the game, the gaming system determines and displays a plurality of symbols at the randomly determined quantity of active symbol display positions associated with the plurality of reels as indicated in block 106 of FIG. 1. For example, for a triggered play of a game, as seen in FIG. 2B, following the determination of a quantity of active symbol display positions 202*a* to 202*y* associated with the plurality of reels 204*a* to 204*f* and following the spinning of the plurality of reels 202*a* to 202*f* (not shown), the gaming system randomly determines a plurality of symbols 206*a* to 206*y* and displays such randomly determined symbols at the randomly determined quantity of symbol display positions 202*a* to 202*y* associated with the plurality of reels 204*a* to 204*f*. It should be appreciated that while displayed as the gaming system first randomly determining and displaying a quantity of symbol display positions to employ for the triggered play of the game (i.e., FIG. 2A) followed by the gaming system randomly determining and displaying a plurality of symbols at the determined plurality of symbol display positions (i.e., FIG. 2B), such determinations may be displayed simultaneously whereby the plurality of reels spin to stop displaying one or more random symbols at each of a randomly determined quantity of active symbol display positions. It should be further appreciated that regardless of the quantity of active symbol display positions of each reel, in the illustrated embodiment, the gaming system displays each reel as the same size, such that the gaming system varies the size of the symbols displayed in each symbol display position to account for the quantity of active symbol display positions of that reel.

Following the determination and display of a plurality of symbols at the randomly determined quantity of active symbol display positions associated with the plurality of reels, for each of a quantity of ways to win determined based on the randomly determined quantity of active symbol display positions, the gaming system determines and displays any award for that way to win as indicated in block 108 of FIG. 1. That is, the gaming system determines any award to provide based on the number of associated symbols which are displayed at the requisite number of adjacent active symbol display positions and not based on any paylines that would have passed through any displayed winning symbol combinations. In these embodiments, the gaming system analyzes the symbols displayed at the active symbol display positions to determine if a string of related symbols (i.e., a plurality of symbols which form part or all of a winning symbol combination) are displayed wherein each string of related symbols includes one symbol from each of a requisite number of adjacent reels. If one or more strings of related symbols are formed, the gaming system determines if any of the strings of related symbols are associated with any awards.

In certain embodiments, the number of ways to win (i.e., the number of symbol combinations which each may be classified as a string of related symbols) which are analyzed is based on the number of symbols displayed at active symbol display positions, such that the greater the number of symbols displayed at active symbol display positions, the greater the number of strings of related symbols to analyze. As such, varying the number of active symbol display positions, via one or more random determinations, varies the number of symbols displayed at such active symbol display positions and thus varies the potential strings of related symbols (which may or may not be associated with awards) to analyze. For example, if, for a first triggered play of a game, the gaming system randomly activates one symbol display position for each of three reels, then that play of the game is associated with one way to win because only one potential string of related symbols may be formed. In this example, if, for a second triggered play of the game, the gaming system randomly activates three symbol display positions for each of three reels, then that play of the game is associated with twenty-seven ways to win because twenty-seven potential strings of related symbols may be formed. In this example, if, for a third triggered play of the game, the gaming system randomly activates one symbol display positions for the first two reels and three symbol display positions for a third reel, then that play of the game is associated with three ways to win because three potential strings of related symbols may be formed. In another example, as seen in FIG. 2B, the random determination of three symbol display positions associated with each of reels 204*a*, 204*b*, and 204*c*, four symbol display positions associated with reel 204*d*; five symbol display positions associated with reel 204*e*, and seven symbol display positions associated with reel 204*f* resulted in 3780 possible ways to win. As seen in these examples, the random determination of the quantity of symbol display positions to activate for each reel determines the quantity of potential strings of related symbols that may be formed and thus determines the quantity of award opportunities available for a triggered play of a game.

In certain embodiments, the gaming system displays a symbol at each of the randomly determined quantity of active symbol display positions and determines if any strings of related symbols are formed between displayed symbols of the first reel and the displayed symbols of the second reel by separately analyzing each of the symbols of the first reel. For example, for a first symbol displayed at an active symbol display position of a first reel, the gaming system determines whether any displayed symbols at any active symbol display positions of a second reel are related to the first displayed symbol of the first reel. If the first displayed symbol of the first reel and a displayed symbol of the second reel are related or otherwise form part or all of a winning symbol combination, the gaming system classifies such symbols as a string of related symbols. In these embodiments, after determining if the first displayed symbol of the first reel is related to any displayed symbols of the second reel, the gaming system determines whether a second displayed symbol, if any, displayed at a second symbol display position of the first reel is related to any displayed symbols of the second reel. If the second displayed symbol of the first reel and a displayed symbol of the second reel are related or otherwise form part or all of a winning symbol combination, the gaming system classifies such symbols as another, separate string of related symbols. This process is repeated for any remaining displayed symbols of the first reel.

After determining if any strings of related symbols are formed between the symbols of the first reel and the symbols of the second reel, the gaming system determines if any of the symbols displayed at active symbol display positions of the next adjacent reel should be added to any of the formed strings of related symbols. In this embodiment, for each classified string of related symbols, the gaming system determines whether any symbols displayed at any active symbol display positions in the next adjacent reel, in this case a third reel, are related to or form part or all of a winning symbol combination with the displayed symbols of that string of related symbols.

If no symbols displayed at active symbol display positions in the next adjacent reel are related to any of the symbols of that string of related symbols, the gaming system marks or flags such string of symbols as complete. If any symbols displayed in the next adjacent reel are related to any of the related symbols which form a string of related symbols, the gaming system adds such symbol in the next adjacent reel to the appropriate string of related symbols. In other words, for each classified string of related symbols, the gaming system analyzes the symbols which form that string of related symbols in light of each of the symbols displayed at active symbol display positions in the next adjacent reel to determine if any of the symbols of the next adjacent reel are related to the symbols which form the previously classified string and thus must be added to that string of related symbols.

For example, if two strings of related symbols are classified based on the symbols displayed at active symbol display positions of a first reel and a second reel, the gaming system determines if any of the symbols at any symbol display positions of a third reel are related to the symbols which formed the first string of related symbols or if any of the symbols at any symbol display positions of the third reel are related to the symbols which formed the second string of related symbols. In this example, if a symbol displayed at an active symbol display position of the third reel is related to the symbols which formed the first string of related symbols, that symbol from the third reel is added to the first string of symbols. Moreover, if none of the symbols displayed at any symbol display positions of the third reel are related to the symbols which formed the second string of related symbols, the gaming system marks or flags the second string of related symbols as complete.

After analyzing the displayed symbols in the next adjacent reel in relation to each of the previously formed strings of related symbols, the gaming system determines if there are any incomplete strings of related symbols remaining or if there is at least one unanalyzed symbol displayed at an active symbol display position of at least another adjacent reel. If there is not at least one unanalyzed symbol displayed at an active symbol display position of at least another adjacent reel, the gaming system marks each of the remaining pending strings of related symbols as complete. If at least one string of related symbol remains incomplete and at least one symbol is displayed in at least one active symbol display position of at least one subsequently adjacent reel, the gaming system continues the above described process for the next adjacent reel. When each string of related symbols is complete, the gaming system compares each of the strings of related symbols to an appropriate paytable to determine any award associated with each of the completed strings of symbols.

While each of these possible ways to win of FIG. 2B will not be individually analyzed, a select few will be described to illustrate how certain embodiments of this gaming system operates. In this example, since active symbol display position 202*a* of reel 204*a* displays a first cherry symbol 206*a* and active symbol display position 202*d* of reel 204*b* displays a second cherry symbol 206*d*, the gaming system classifies the two cherry symbols as a string of related symbols because the two cherry symbols form part of a winning symbol combination. Also in this example, since active symbol display position 202*a* of reel 204*a* displays a first cherry symbol 206*a* and active symbol display position 202*e* of reel 204*b* displays a banana symbol 206*e*, the gaming system does not classify the cherry symbol and the banana symbol as a string of related symbols because these symbols form no part of any winning symbol combination.

In this illustrated example, after classifying the string of related cherry symbols and determining that no other strings of related symbols are formed between the symbols displayed at the active symbol display positions 202*a* to 202*c* of reel 204*a* and the active symbol display positions 202*d* to 202*f* of reel 204*b*, since the formed string of related cherry symbols is incomplete and at least one unanalyzed symbol is displayed at at least one of the active symbol display positions 202*g* to 202*i* of the next reel 204*c*, the gaming system determines whether any symbols of the next adjacent reel 204*c* need to be added to the formed string of related cherry symbols. In this case, since the double bar symbol 206*g* at symbol display position 202*g* of reel 204*c* is not related to the symbols of the string of related cherry symbols, the gaming system does not add that double bar symbol to the string of related cherry symbols and considers that string of two related cherry symbols complete. However, also in this case, since the cherry symbol 206*h* at symbol display position 202*h* of reel 204*c* is related to the symbols of the formed string of related cherry symbols, the gaming system adds that cherry symbol 206*h* to the string of related cherry symbols. This process continues until no more symbols may be added to any strings or all strings are otherwise complete, at which time the gaming system determines an award for each completed formed string of related symbols. In this example, after adding cherry symbol 206*k* at symbol display position 202*k* of reel 204*d* to the previously formed string of related cherry symbols and after marking the string of related cherry symbols as complete due to the inability to add any more cherry symbols to the string, as seen in FIG. 2B, the gaming system utilizes an appropriate paytable to determine that the completed string of four related cherry symbols is a winning symbol combination associated with an award of five-hundred credits.

In certain embodiments, following the determination of any awards for any formed strings of related symbols, the gaming system removes and discards the displayed symbols that form the winning symbol combinations associated with the formed strings of related symbols to create one or more empty symbol display positions. The gaming system then shifts zero, one, or more of the remaining displayed symbols downward into zero, one, or more of the created empty symbol display positions. If any empty symbol display positions remain, the gaming system randomly determines and displays a symbol for each remaining empty symbol display position. The gaming system then reevaluates the displayed for any winning symbol combinations formed as described above. If winning symbol combinations continue to be formed, the gaming system repeats the removing displayed symbols of the winning symbol combinations, the shifting displayed symbols, the randomly determining new symbols, and the evaluating the then displayed symbols until no winning symbol combination is formed. In certain other embodiments, following the determination of any awards for any formed strings of related symbols, the gaming system concludes the play of the game without any removal of any displayed symbols.

In certain embodiments, the gaming system analyzes the symbols displayed at active symbol display positions in a left-to-right configuration. In certain embodiments, the gaming system analyzes the symbols displayed at active symbol display positions in a right-to-left configuration. In certain embodiments, the gaming system analyzes one or more of the symbols displayed at active symbol display positions in a left-to-right configuration and also analyzes one or more of the symbols displayed at active symbol display positions in a right-to-left configuration.

It should be appreciated that, in certain embodiments, since the gaming system does not analyze each of the symbols displayed on each of a plurality of paylines, but rather analyzes each of the symbols displayed at active symbol display positions of a first reel and a second reel and then analyzes only the symbols which may be added to any active or incomplete string of related symbols, the processor of such a gaming system of these embodiments may commit less calculations and thus the entire award determination sequence may occur quicker than in a traditional gaming system which analyzes each wagered on payline and may also be quicker than a gaming system which analyzes symbols based on a scatter pay configuration. For example, a gaming system with five reels of five symbol display positions per reel may take a relatively significant amount of time computing the outcomes along the over three-thousand paylines which may be wagered on, while a comparable ways to win gaming system with over three-thousand wagered on ways to win would take relatively significantly less computing time. Moreover, since a determined award is based on formed strings of related symbols and not symbols displayed on or along active paylines, the gaming system of these embodiments enables the relatively easier determination, by a user, of why a certain award may have been won. That is, in a ways to win gaming system, a user need simply count the number of related symbols displayed at adjacent active symbol display positions and thus avoids the complications of trying to follow each of the symbols displayed on or along a plurality of different paylines.

It should be further appreciated that unlike prior gaming systems that scaled the wager amount placed on a play of a game to the quantity of ways to win to employ for that play of the game, in certain embodiments, the random determination of the quantity of symbol display positions to activate (i.e., the random determination of the quantity of ways to win) disassociates the quantity of ways to win from the wager amount placed. Put differently, rather than requiring a greater wager amount to activate a greater quantity of symbol display positions to potentially form a greater quantity of strings of related symbols, the gaming system employs one or more random determinations independent of the amount of the wager. Such a configuration thus provides that, in certain instances, a relatively low wager amount (that would, in prior gaming systems, be associated with a relatively low quantity of symbol display positions to activate and thus a relatively low quantity of ways to win) is associated with one or more random determinations resulting in a relatively high quantity of symbol display positions to activate and thus a relatively high quantity of ways to win.

In certain embodiment, rather than building strings of related symbols based on the symbols displayed at active symbol display positions, the gaming system utilizes an award determination sequence which includes analyzing each occurrence of a winning symbol combination and providing an award for each such occurrence. In these embodiments, each winning symbol combination must include a requisite number of symbols displayed at active symbol display positions over a requisite number of reels. For example, each winning symbol combination must include at least three adjacent symbols displayed at active symbol display positions of three adjacent reels, wherein one of the reels is a first designated reel. In such embodiments, if the same set of symbols may be combined for two or more winning symbol combinations, the gaming system will determine an award for one of the winning symbol combinations and not each of the winning symbol combinations that the set of symbols may form. For example, if five displayed seven symbols displayed at five active symbol display positions form a winning symbol combination, the gaming system will determine an award for the five displayed seven symbols, but the gaming system will not determine an award for the symbol combinations of three displayed seven symbols or four displayed seven symbols, even though such three and four seven symbol combinations may otherwise be winning symbol combinations associated with an award and even though the symbol combinations of three displayed seven symbols or four displayed seven symbols may otherwise be included in other ways to win.

In certain embodiments, the gaming system determines any award based on the number of associated symbols which are displayed at active symbol display positions of the requisite number of adjacent reels and also based on any winning symbols of winning symbol combinations which are displayed on or along any active paylines and/or in a scatter configuration. In these embodiments, in addition to analyzing the symbols displayed by the reels in each of the active symbol display positions to determine if any string of related symbols are associated with any awards, the gaming system also analyzes the symbols displayed at active symbol display positions on or along one or more of the wagered on paylines and/or in a scatter configuration to determine if any displayed winning symbol or winning symbol combination are associated with any awards.

In certain embodiments, in addition to determining any award based on the number of associated symbols which are displayed at active symbol display positions of the requisite number of adjacent reels, upon an occurrence of a symbol accumulation sequence triggering event, the gaming system triggers a symbol accumulation sequence as indicated in block 110. In these embodiments, if no symbol accumulation sequence triggering event occurs, the gaming system does not proceed to any triggered symbol accumulation sequence but rather awaits another occurrence of a game triggering event to randomly determine another quantity of symbol display positions to activate. On the other hand, if a symbol accumulation sequence triggering event occurs, the gaming system proceeds to a triggered symbol accumulation sequence in which the previously randomly determined quantity of activated symbol display positions is further utilized in the triggered symbol accumulation sequence.

In certain embodiments in which the symbol accumulation sequence comprises a plurality of initial plays of a secondary game, such as a free spin game, wherein the sequence triggering event occurs based on a displayed event associated with a play of a primary game. In another embodiment in which the symbol accumulation sequence comprises a plurality of initial plays of a secondary game, such as a free spin game, the sequence triggering event occurs based on an event independent of any displayed event associated with the play of the primary game. For example, as seen in FIG. 2B, the display of award symbols 206*i*, 206*m*, 206*p*, 206*w*, and 206*y* at symbol display positions 202*i*, 202*m*, 202*p*, 202*w*, and 202*y*, respectively, caused the triggering of the symbol accumulation sequence as well as the accumulation of award symbols 206*i*, 206*m*, 206*p*, 206*w*, and 206*y* at symbol display positions 202*i*, 202*m*, 202*p*, 202*w*, and 202*y*, respectively, for the triggered symbol accumulation sequence. In certain embodiments in which the symbol accumulation sequence comprises a plurality of initial plays of a primary game, such as a primary wagering game, wherein the sequence triggering event includes the placement of a wager on one or more of the plays of the primary game.

Figure 2C:
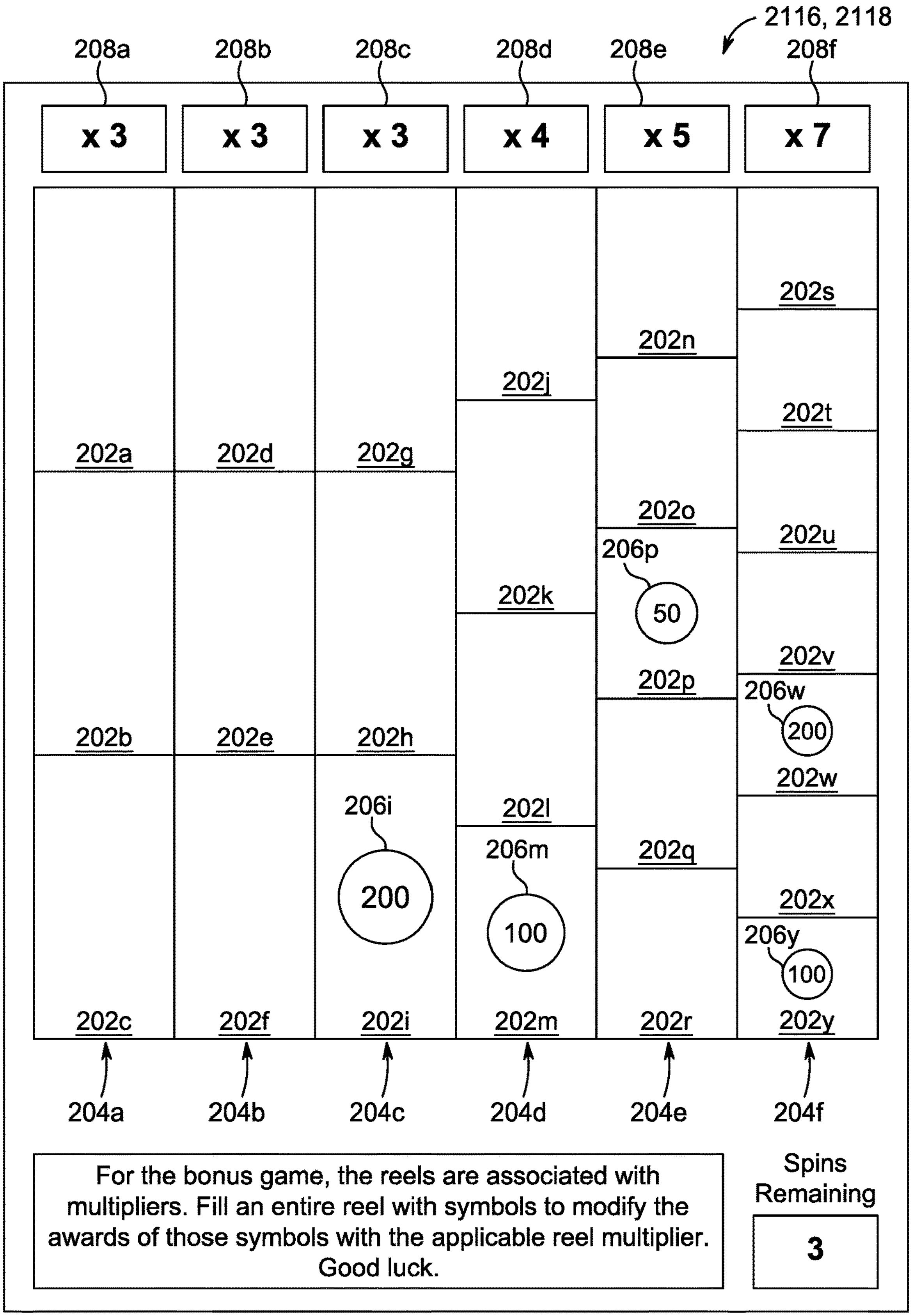

For the triggered symbol accumulation sequence, as indicated in block 112, the gaming system assigns zero, one or more modifiers to zero, one or more of the reels wherein any assigned modifier is based on the random quantity of symbol display positions associated with that reel. In certain embodiments, the gaming system determines one or more multipliers to assign or otherwise associate with one or more reels wherein for each reel, the value of each multiplier equals the value of the quantity of symbol display positions randomly determined to be associated with that reel. For example, as seen in FIG. 2C, for the triggered symbol accumulation sequence, the gaming system determines that since (i) three symbol display positions were previously randomly determined to be associated with each of reels 204*a*, 204*b*, and 204*c*, (ii) four symbol display positions were previously randomly determined to be associated with reel 204*d*, (iii) five symbol display positions were previously randomly determined to be associated with reel 204*e*, and (v) seven symbol display positions were previously randomly determined to be associated with reel 204*f*, (a) reels 204*a*, 204*c*, and 204*c* are assigned a multiplier of 3× 208*a* to 208*c*, (b) reel 204*d* is assigned a multiplier of 4× 208*d*, (c) reel 204*e* is assigned a multiplier of 5× 208*e*, and (d) reel 204*f* is assigned a multiplier of 7× 208*f*. In certain embodiments, the gaming system determines and assigns one or more modifiers with one or more reels wherein for each reel, the value of each modifier corresponds to (but does not equal) the value of the quantity of symbol display positions randomly determined to be associated with that reel. For example, for a reel associated with a randomly determined quantity of three symbol display positions, the gaming system determines and assigns a multiplier of 6× and for a reel associated with a randomly determined quantity of four symbol display positions, the gaming system determines and assigns a multiplier of 8×.

In addition to assigning zero, one or more modifiers to zero, one or more reels, for the triggered symbol accumulation sequence, the gaming system determines if the symbol accumulation sequence includes at least one remaining unplayed game as indicated in diamond 114 of FIG. 1. In certain embodiments, the symbol accumulation sequence includes a plurality of initial plays of a game wherein that plurality of initial plays of the game may be supplemented with additional plays of the game, such as responsive to a retriggering event. In these embodiments, the gaming system determines if at least one unplayed game remains from the initial plurality of plays of the game of the triggered symbol accumulation sequence or any additional plays of the game provided in association with the symbol accumulation sequence subsequent to the occurrence of the symbol accumulation sequence triggering event. In certain other embodiments, the symbol accumulation sequence includes a plurality of initial plays of a game wherein that plurality of initial plays of the game may not be supplemented with additional plays of the game. In certain embodiments, the quantity of initial plays of the game of the triggered symbol accumulation sequence is based on one or more displayed events or elements, such as based on a quantity of triggering symbols that caused the triggering of the symbol accumulation sequence. In certain embodiments, the quantity of initial plays of the game of the triggered symbol accumulation sequence is independent of any displayed events or elements.

If the gaming system determines that at least one unplayed game remains associated with the symbol accumulation sequence, at each of zero, one or more symbol display positions not associated with an accumulated symbol, the gaming system determines and displays a symbol associated with an award as indicated in block 116. In certain embodiments, the gaming system randomly determines, for each available symbol display position, whether or not to display any of a plurality of symbols at that available symbol display position. In operation of certain embodiments, the gaming system randomly determines which symbols, if any, to display at which symbol display positions based on the award of that symbol. For example, a symbol with a relatively low award has a first probability of being randomly displayed at a symbol display position and a symbol with a relatively high award has a second, lower probability of being randomly displayed at a symbol display position.

In addition to displaying zero, one or more symbols at zero, one or more available symbol display positions (i.e., symbol display positions not associated with any previously accumulated symbols), the gaming system accumulates each displayed symbol in association with the symbol display position where that symbol is displayed as indicated in block 118. In these embodiments, the gaming system operates by accumulating up to one symbol at each symbol display position such that if a symbol was previously accumulated in association with a symbol display position, that accumulated symbol persists for subsequent plays of the game and the gaming system does not display nor accumulate any additional symbols at that symbol display position. In certain other embodiments, the gaming system operates by accumulating up to a designated quantity of at least two symbols at each symbol display position such that if the designated quantity of symbols were previously accumulated in association with a symbol display position, those accumulated symbols persist for subsequent plays of the game and the gaming system does not display nor accumulate any additional symbols at that symbol display position.

In certain embodiments, upon a triggering of the symbol accumulation sequence, each of the symbol display positions are available to potentially display a symbol (i.e., none of the symbol display positions are unavailable due to being associated with a previously accumulated symbol). In certain other embodiments, upon a triggering of the symbol accumulation sequence, certain of the symbol display positions are available to potentially display a symbol and certain of the symbol display positions are unavailable to potentially display a symbol. In one such embodiment, such symbol display positions are unavailable because of a prior accumulation of symbols at such symbol display positions in association with the triggering of the symbol accumulation sequence. For example, following the triggering of a symbol accumulation sequence initially including three plays of the game, as seen in FIG. 2C, for this first play of the game of the symbol accumulation sequence, the gaming system displays symbol display positions 202*i*, 202*m*, 202*p*, 202*w*, and 202*y* as unavailable to display any additional symbols (based on the previous accumulation of award symbols 206*i*, 206*m*, 206*p*, 206*w*, and 206*y* at symbol display positions 202*i*, 202*m*, 202*p*, 202*w*, and 202*y*, respectively).

In this example, following the determination that at least one play of the game remains of the triggered symbol accumulation sequence, for the first play of a game of the symbol accumulation sequence, the gaming system spins the plurality of reels (not shown), wherein when stopped, the gaming system displays symbol 206*z* associated with an award of five-hundred at symbol display position 202*e*, symbol 206*aa* associated with an award of three-hundred at symbol display position 202*h*, and symbol 206*bb* associated with an award of one-hundred at symbol display position 202*r*. The gaming system accumulates each of these three symbols in association with its respective symbol display position. In this example, since at least one symbol was accumulated from this play of the game, the gaming system resets the quantity of plays of the game remaining for the triggered symbol accumulation sequence back to three plays of the game.

In addition to determining, displaying and accumulating zero, one or more symbols at zero, one or more symbol display positions, the gaming system determines if a symbol modification event has occurred in association with any accumulated symbols as indicated in diamond 120 of FIG. 1. In certain embodiments, a symbol modification event occurs in association with an accumulated symbol based on one or more displayed events or elements. In certain embodiments, a symbol modification event occurs independent of any displayed events or elements.

In certain embodiments, a symbol modification event occurs in association with one or more accumulated symbols based on an accumulated symbol being displayed at each of the symbol display positions associated with a reel. In certain embodiments, a symbol modification event occurs in association with one or more accumulated symbols based on an accumulated symbol being displayed at each of the symbol display positions associated with two or more reels. In certain embodiments, a symbol modification event occurs in association with one or more accumulated symbols based on an accumulated symbol being displayed at at least two of, but less than each of, the symbol display positions associated with a reel. In certain embodiments, a symbol modification event occurs in association with one or more accumulated symbols based on an accumulated symbol being displayed at at least two of, but less than each of the symbol display positions associated with two or more reels. It should be appreciated that in these embodiments, since different reels are associated with different quantities of symbol display positions, the symbol modification event has different probabilities of occurring in association with different reels. For example, a first reel randomly associated with a quantity of three symbol display positions has a first probability of causing a symbol modification event to occur in association with the accumulation of three symbols at the three symbol display positions of that first reel, while a second reel randomly associated with a quantity of six symbol display positions has a second, different probability of causing a symbol modification event to occur in association with the accumulation of six symbols at the six symbol display positions of that second reel.

In certain embodiments, a symbol modification event may occur in association with any accumulated symbol displayed. In these embodiments, any symbol, once accumulated, may be subject to a modification of the award of that symbol in association with a symbol modification event. In certain embodiments, a symbol modification event may occur in association with certain accumulated symbols but not occur in association with other accumulated symbols. In certain of these embodiments, the gaming system employs designated symbols (which may have an award modified responsive to a symbol modification event) and non-designated symbols (which may not have an award modified responsive to a symbol modification event).

In certain embodiments, a symbol modification event may occur in association with any accumulated symbol at any symbol display position associated with any reel. In these embodiments, any symbol, once accumulated at any symbol display position, may be subject to a modification of the award of that symbol in association with a symbol modification event. In certain embodiments, a symbol modification event may occur in association with symbols accumulated at certain symbol display positions associated with certain reels but not occur in association with symbols accumulated at other symbol display positions associated with other reels. In certain of these embodiments, the gaming system employs designated symbol display positions (which may have the award of a symbol at that symbol display position modified responsive to a symbol modification event) and non-designated symbol display positions (which may not have the award of a symbol at that symbol display position modified responsive to a symbol modification event). In certain embodiments, a symbol modification event may occur in association with certain symbols accumulated at certain symbol display positions. In these embodiments, the gaming system employs designated symbol display positions (which may have the award of a designated or predetermined symbol at that symbol display position modified responsive to a symbol modification event) and non-designated symbol display positions (which may not have the award of the designated or predetermined symbol at that symbol display position modified responsive to a symbol modification event).

In certain embodiments, a symbol modification event may occur in association with any reel. In certain embodiments, a symbol modification event may occur in association with certain reels but not occur in association with other reels. In certain of these embodiments, the gaming system employs designated reels (which may display a symbol at a symbol display position associated with that reel that is modified responsive to a symbol modification event) and non-designated symbol display positions (which may display a symbol at a symbol display position associated with that reel that is not modified responsive to a symbol modification event).

Figure 2D:
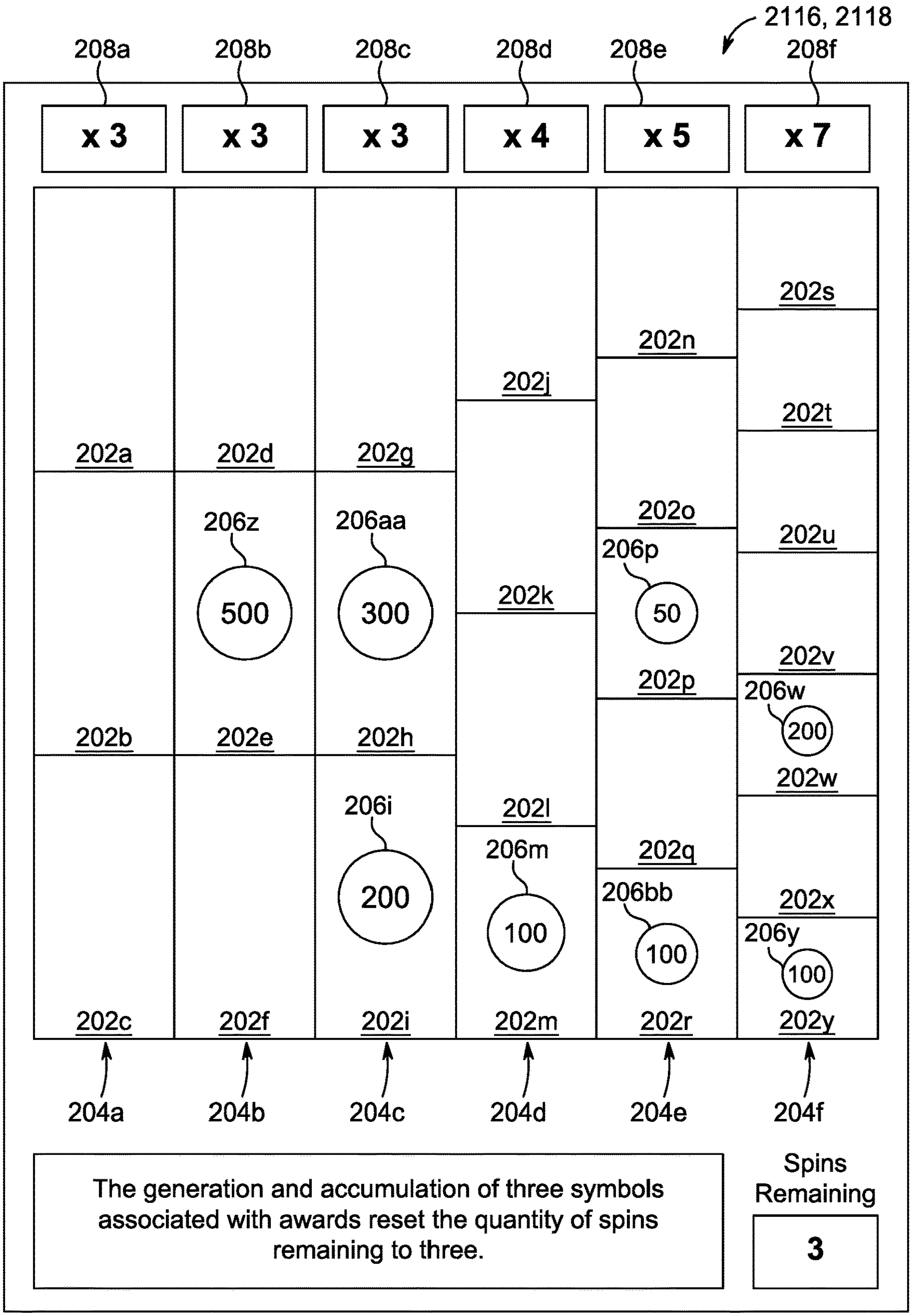

If the gaming system determines that no symbol modification event occurred in association with any accumulated symbols, the gaming system returns to diamond 114 and proceeds as described above with again determining if at least one unplayed game remains associated with the symbol accumulation sequence. For example, responsive to a determination that no symbol modification event occurred because none of the reels display an accumulated symbol at each of the randomly determined quantity of symbol display positions associated with that reel and further responsive to a determination that at least one unplayed game remains associated with the symbol accumulation sequence (as seen in FIG. 2D), the gaming system proceeds with the determination, display and accumulation of zero, one or more symbols at zero, one or more symbol display positions.

Figure 2E:
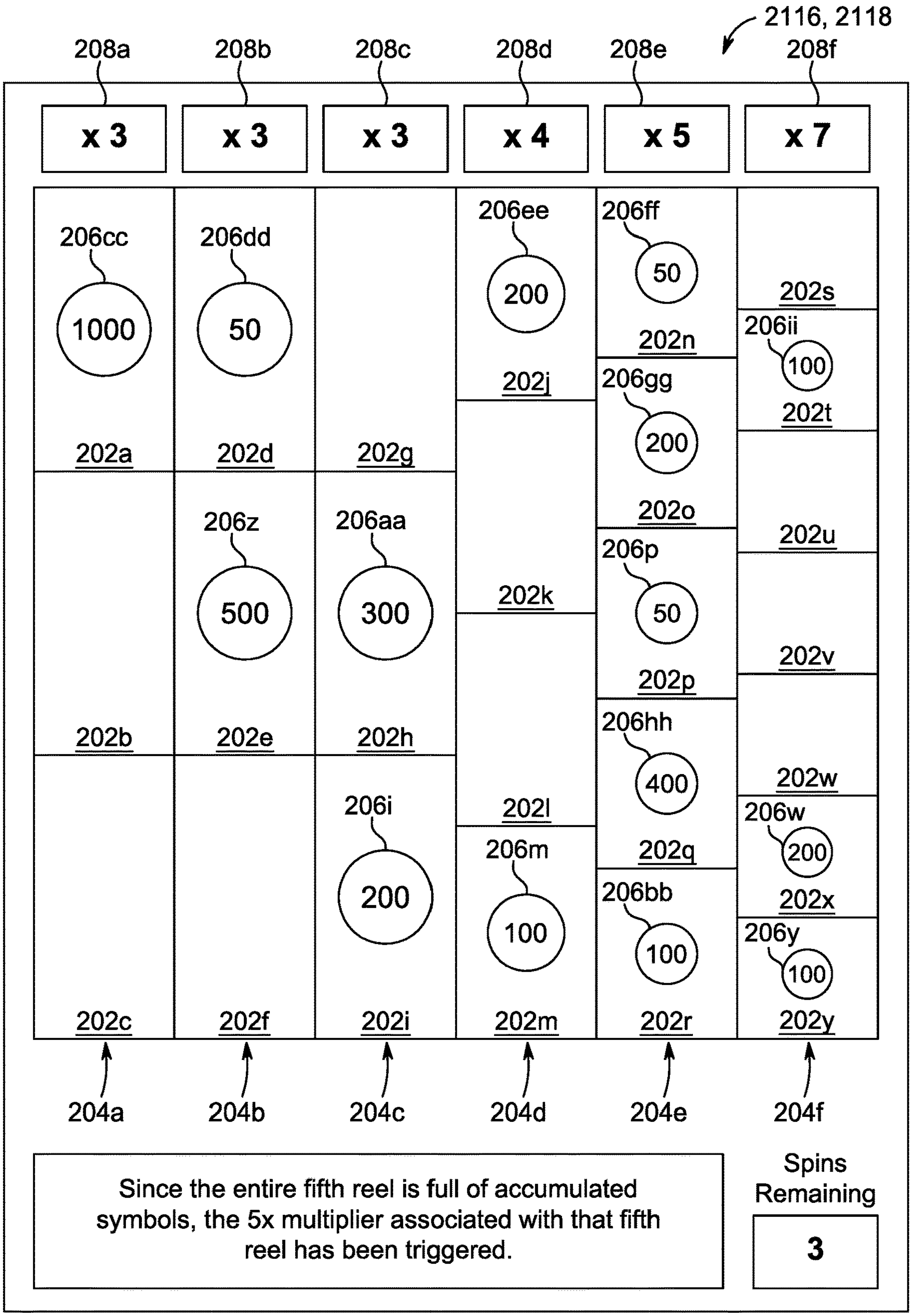
Figure 2F:
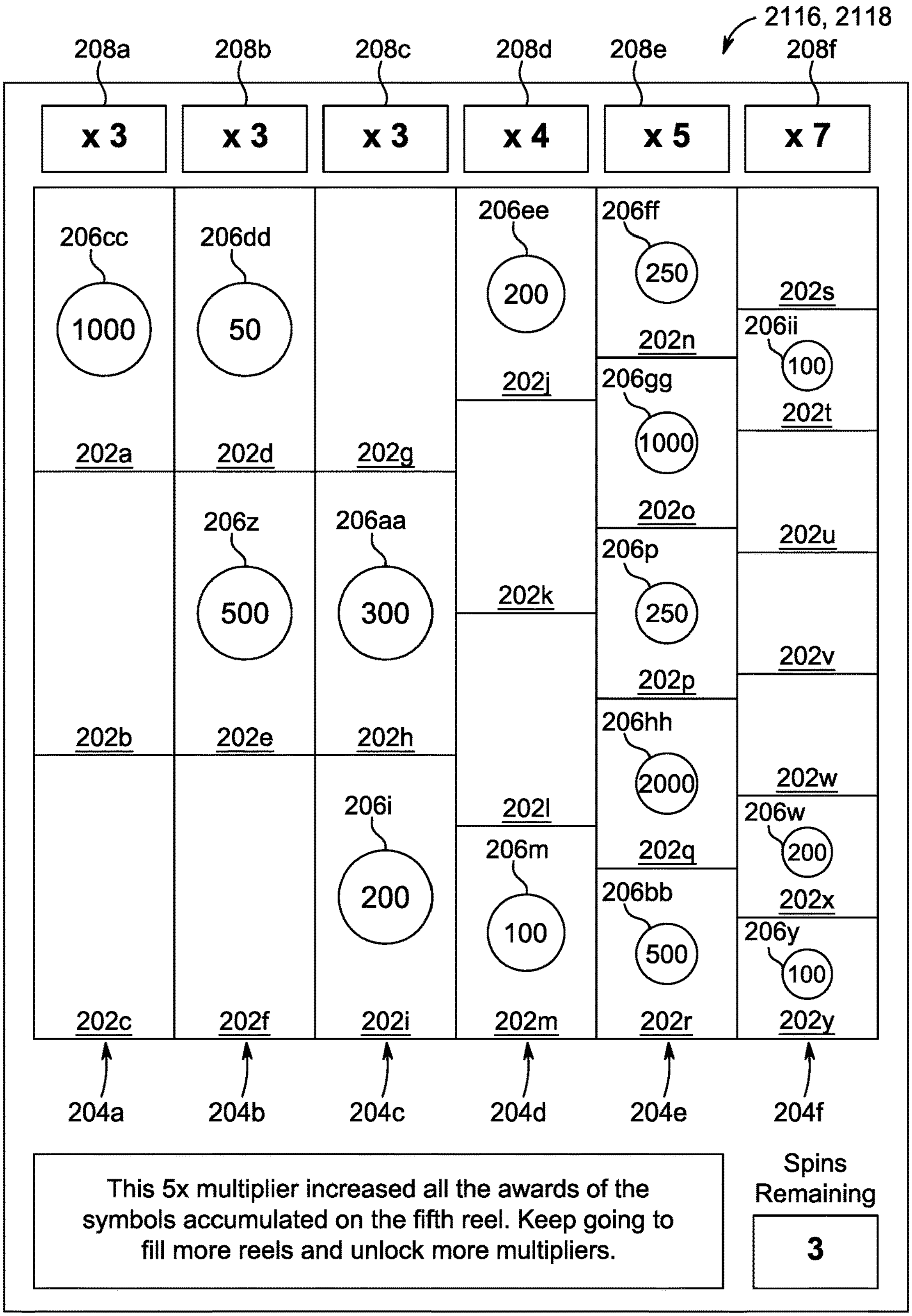

On the other hand, if the gaming system determines that a symbol modification event occurred in association with at least one symbol, then for each symbol that the symbol modification event occurred in association with, the gaming system applies a modification to the award of that symbol as indicated in block 122. In certain embodiments, as further seen in block 122, the modification to the award of each symbol associated with the occurrence of the symbol modification event includes modifying the award associated with that symbol based on the multiplier assigned to the reel associated with the symbol display position displaying that symbol. In certain such embodiments in which a symbol modification event occurs based on an accumulated symbol being displayed at each of the randomly determined quantity of symbol display positions associated with a reel, the gaming system causes a modification, based on the modifier assigned to that reel, to each of the awards associated with each of the accumulated symbols. For example, as seen in FIG. 2E, following a plurality of additional plays of the game of the symbol accumulation sequence wherein seven additional symbols 206*cc* to 206*ii* were determined, displayed and accumulated at symbol display positions 202*a*, 202*d*, 202*j*, 202*n*, 202*o*, 202*hh*, and 202*t*, respectively (not shown), the gaming system determined that the accumulation of symbols 206*ff*, 206*gg*, 206*p*, 206*q*, and 206*bb* at symbol display positions 202*n*, 202*o*, 202*p*, 202*q*, and 202*r* associated with reel 204*e* resulted in the occurrence of a symbol modification event. As such, as seen in FIG. 2F, the gaming system employs the multiplier of 5× 208*e* assigned to reel 204*e* to increase each of the individual awards associated with each of the symbols 206*ff*, 206*gg*, 206*p*, 206*hh*, and 206*bb* accumulated at symbol display positions 202*n*, 202*o*, 202*p*, 202*q*, and 202*r* associated with reel 204*e*.

Following the occurrence of one or more symbol modification events, the gaming system returns to diamond 114 and proceeds as described above with again determining if at least one unplayed game remains associated with the symbol accumulation sequence.

In certain embodiments, such a process of determining and displaying symbols associated with awards at available symbol display positions, accumulating such displayed symbols and potentially modifying the awards of these accumulated symbols continues for each play of the game of the symbol accumulation sequence until the gaming system determines that the symbol accumulation sequence includes no remaining unplayed games. In certain other embodiments, such a process of determining and displaying symbols associated with awards at available symbol display positions, accumulating such displayed symbols and potentially modifying the awards of these accumulated symbols continues for each play of the game of the symbol accumulation sequence until a symbol is accumulated at each symbol display position or the gaming system determines that the symbol accumulation sequence includes no remaining unplayed games.

Figure 2G:
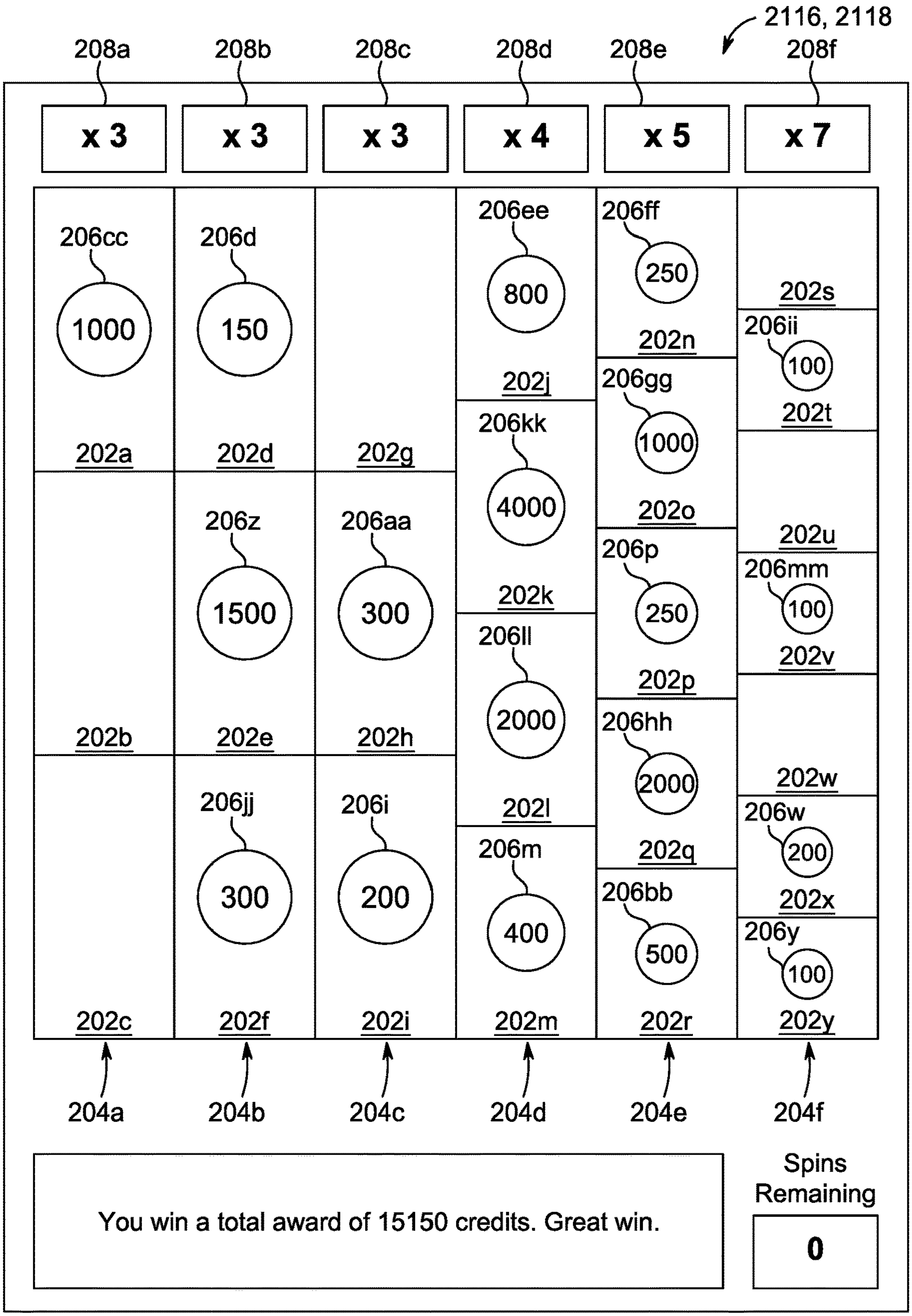

If no unplayed games of the symbol accumulation sequence remain, the gaming system determines and displays a total award based on the current awards of any accumulated symbols as indicated in block 124. In these embodiments, since zero, one or more awards of zero, one or more accumulated symbols were modified responsive to zero, one or more symbol modification events occurring during the symbol accumulation sequence, the gaming system accounts for any such modifications in determining a total award for the symbol accumulation sequence. For example, as seen in FIG. 2G, following a plurality of additional plays of the game (not shown) that resulted in at least the occurrence of a symbol modification event based on each of the random quantity of symbol display positions of reels 204*b* and 204*d* displaying an accumulated symbol and the resulting modification, based on the modifier assigned to reels 204*b* and 204*d*, of the awards associated with such accumulated symbol, the gaming system determines that no unplayed games remain in the symbol accumulation sequence. As such, the gaming system proceeds to determine a total award for the symbol accumulation sequence which is based on the current value of the awards of the accumulated symbols.

In certain embodiments, the gaming system employs a total award meter that grows in value each time a symbol is determined, displayed and accumulated at a symbol display position. In these embodiments, each time a symbol modification event occurs in association with an accumulated symbol, the gaming system increases the value of the total award meter to account for the modified award associated with that accumulated symbol. Such a configuration provides that the same award may be added to the total award meter multiple times if the award associated with an accumulated symbol is modified at least once.

In certain embodiments, zero, one or more awards associated with one or more symbols and/or a total award determined in association with a triggered symbol accumulation sequence includes one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps (e.g., a free dinner, a free night's stay at a hotel), a relatively high value product (e.g., a free car), one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In certain embodiments, zero, one or more awards associated with one or more symbols and/or a total award determined in association with a triggered symbol accumulation sequence includes an activation of a feature of a game. In different embodiments, such features include any feature that results in a modification of one or more components, aspects, or elements of one or more subsequent plays of a game, such as the modification of one or more game outcomes of one or more plays of a game (e.g., the symbols evaluated for the play(s) of the game), the modification of the paytable utilized for one or more plays of the game and/or the modification of any award determined for one or more plays of the game. In different embodiments, such features include, but are not limited to: a feature which superimposed one or more symbols over the randomly generated symbols of the reels; a feature which replaces one or more symbols of the randomly generated symbols of the reels with a predetermined symbol pattern; a feature which replaces one or more symbols of the randomly generated symbols of the reels with a predetermined pattern of wild symbols; a modifier, such as a multiplier, feature; a book-end wild symbols feature; a stacked wild symbols feature; an expanding wild symbols feature; a nudging wild symbols feature; a feature modifying a quantity of wild symbols available to be generated; a retrigger symbol feature; an anti-terminator symbol feature; a locking reel feature; an expanding reel feature; a locking symbol position feature; a feature modifying a placed wager amount; a feature modifying a placed side wager amount; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying a paytable utilized for a play of a game; a feature modifying an average expected payback percentage of a play of a game; a feature modifying an average expected payout of a play of a game; a feature modifying one or more awards available; a feature modifying a range of awards available; a feature modifying a type of awards available; a feature modifying one or more progressive awards; a feature modifying which progressive awards are available to be won; a feature modifying one or more modifiers, such as multipliers, available; a feature modifying an activation of a reel (or a designated reel); a feature modifying an activation of a plurality of reels; a feature modifying a generated outcome (or a designated generated outcome); a feature modifying a generated outcome (or a designated generated outcome) associated with an award over a designated value; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a quantity of picks in a selection game; a feature modifying a quantity of offers in an offer and acceptance game; a feature modifying a quantity of moves in a trail game; a feature modifying an amount of free spins provided; a feature modifying a game terminating or ending condition; a feature modifying how one or more aspects of one or more games (e.g., colors, speeds, sound) are displayed to a player; and/or a feature modifying any game play feature associated with any play of any game of the present disclosure.

In different embodiments, as described above, a game triggering event, a symbol display position quantity determination event, a symbol accumulation sequence triggering event, and/or a symbol modification event occurs based on an outcome associated with one or more plays of any primary games or any secondary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game (and/or a secondary game) causes such conditions to be satisfied and/or one or more of such events to occur.

In different embodiments, the gaming system does not provide any apparent reasons to the players for an occurrence of a game triggering event, a symbol display position quantity determination event, a symbol accumulation sequence triggering event, and/or a symbol modification event. In these embodiments, such determinations are not triggered by an event in a primary game or based specifically on any of the plays of any primary games or any secondary games. That is, these events occur without any explanation or alternatively with simple explanations.

In one such embodiment, a game triggering event, a symbol display position quantity determination event, a symbol accumulation sequence triggering event, and/or a symbol modification event occurs based on an amount of coin-in. In this embodiment, the gaming system determines if an amount of coin-in reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a game triggering event, a symbol display position quantity determination event, a symbol accumulation sequence triggering event, and/or a symbol modification event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a game triggering event, a symbol display position quantity determination event, a symbol accumulation sequence triggering event, and/or a symbol modification event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a game triggering event, a symbol display position quantity determination event, a symbol accumulation sequence triggering event, and/or a symbol modification event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a game triggering event, a symbol display position quantity determination event, a symbol accumulation sequence triggering event, and/or a symbol modification event occurs based on a predefined variable reaching a defined parameter threshold. For example, when the 500,000$^{th}$ player has played an EGM (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In different embodiments, a game triggering event, a symbol display position quantity determination event, a symbol accumulation sequence triggering event, and/or a symbol modification event occurs based on a quantity of games played. In this embodiment, a quantity of games played is set for when one or more of such events or conditions will occur. In one embodiment, such a set quantity of games played is based on historic data.

In different embodiments, a game triggering event, a symbol display position quantity determination event, a symbol accumulation sequence triggering event, and/or a symbol modification event occurs based on time. In this embodiment, a time is set for when one or more of such events or conditions will occur. In one embodiment, such a set time is based on historic data.

In different embodiments, a game triggering event, a symbol display position quantity determination event, a symbol accumulation sequence triggering event, and/or a symbol modification event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the EGM and/or logs into the player tracking system using a mobile device, such as a personal gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments, a game triggering event, a symbol display position quantity determination event, a symbol accumulation sequence triggering event, and/or a symbol modification event occurs based on a system determination, including one or more random selections by the central controller. For example, as described above, the gaming system tracks all active EGMs and the wagers they placed, wherein based on the EGM's state as well as one or more wager pools associated with the EGM, the gaming system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a game triggering event, a symbol display position quantity determination event, a symbol accumulation sequence triggering event, and/or a symbol modification event occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur.

It should be appreciated that any suitable manner of causing a game triggering event, a symbol display position quantity determination event, a symbol accumulation sequence triggering event, and/or a symbol modification event to occur may be implemented in accordance with the gaming system and method of the present disclosure. It should be further appreciated that one or more of the above-described triggers pertaining to a game triggering event, a symbol display position quantity determination event, a symbol accumulation sequence triggering event, and/or a symbol modification event occurring may be combined in one or more different embodiments.

It should be further appreciated that in different embodiments, one or more of: when a game triggering event, a symbol display position quantity determination event, a symbol accumulation sequence triggering event, and/or a symbol modification event occurs; a quantity of symbol display positions to activate for one or more reels; a quantity of symbol display positions to deactivate for one or more reels; which symbols to display at one or more active symbol display positions; which awards to associate with which symbols; which symbols to accumulate at which symbol display positions; a type of modification of an award associated with an accumulated symbol; an amount of a modification of an award associated with an occurrence of a symbol modification event; and/or any determination of the present disclosure is/are predetermined, randomly determined, randomly determined based on one or more weighted percentages, determined based on a symbol or symbol combination, determined independent of any symbols or symbol combinations, determined based on a random determination by a server, determined independent of a random determination by a server, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations of the present disclosure, determined independent of any other determination of the present disclosure or determined based on any other suitable method or criteria.

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a casino floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 3:
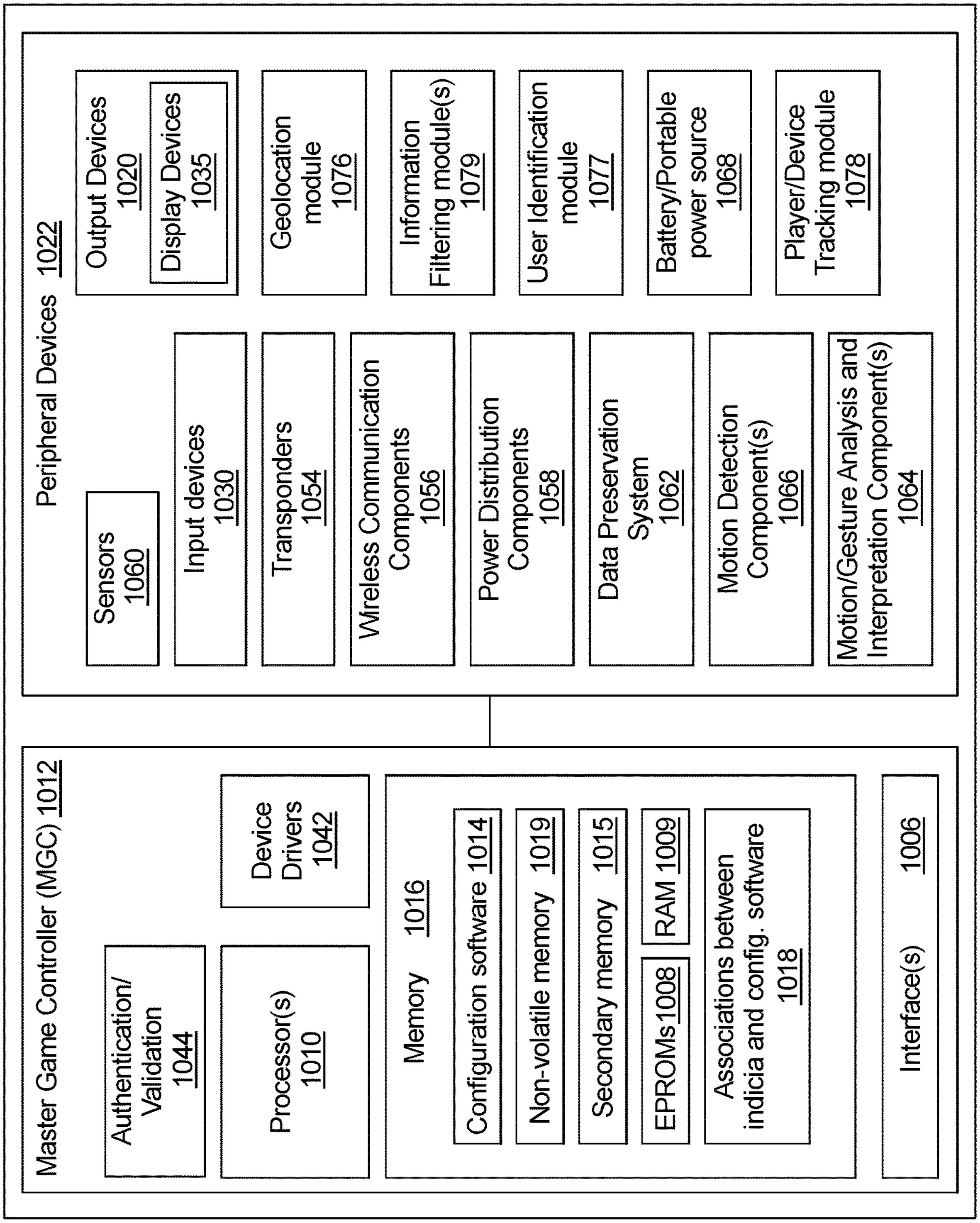
FIG. 3 is a schematic block diagram of one embodiment of an electronic configuration of an example electronic gaming machine of the present disclosure.
Figure 4A:
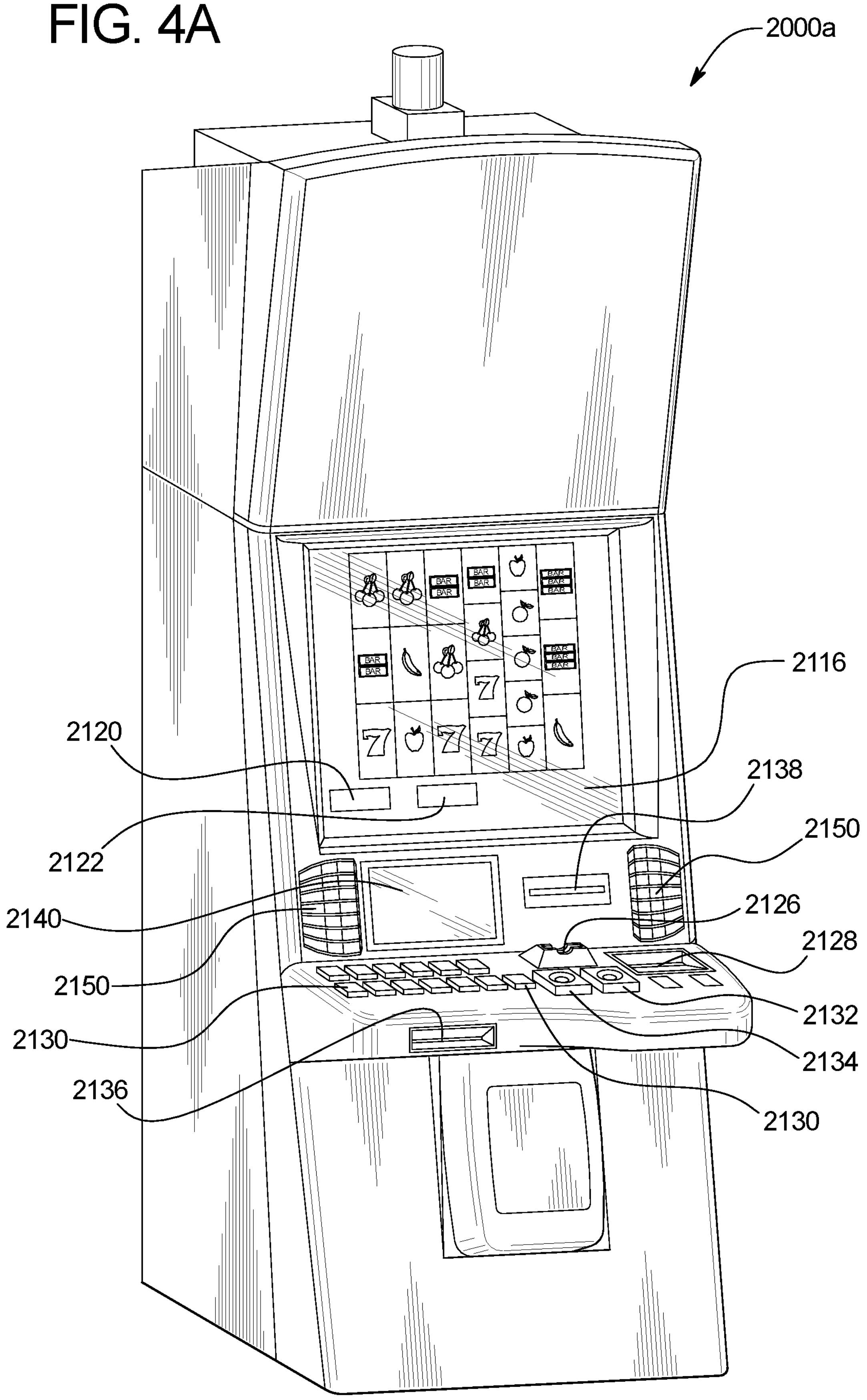
FIGS. 4A and 4B are perspective views of example alternative embodiments of an electronic gaming machine of the present disclosure.
Figure 4B:
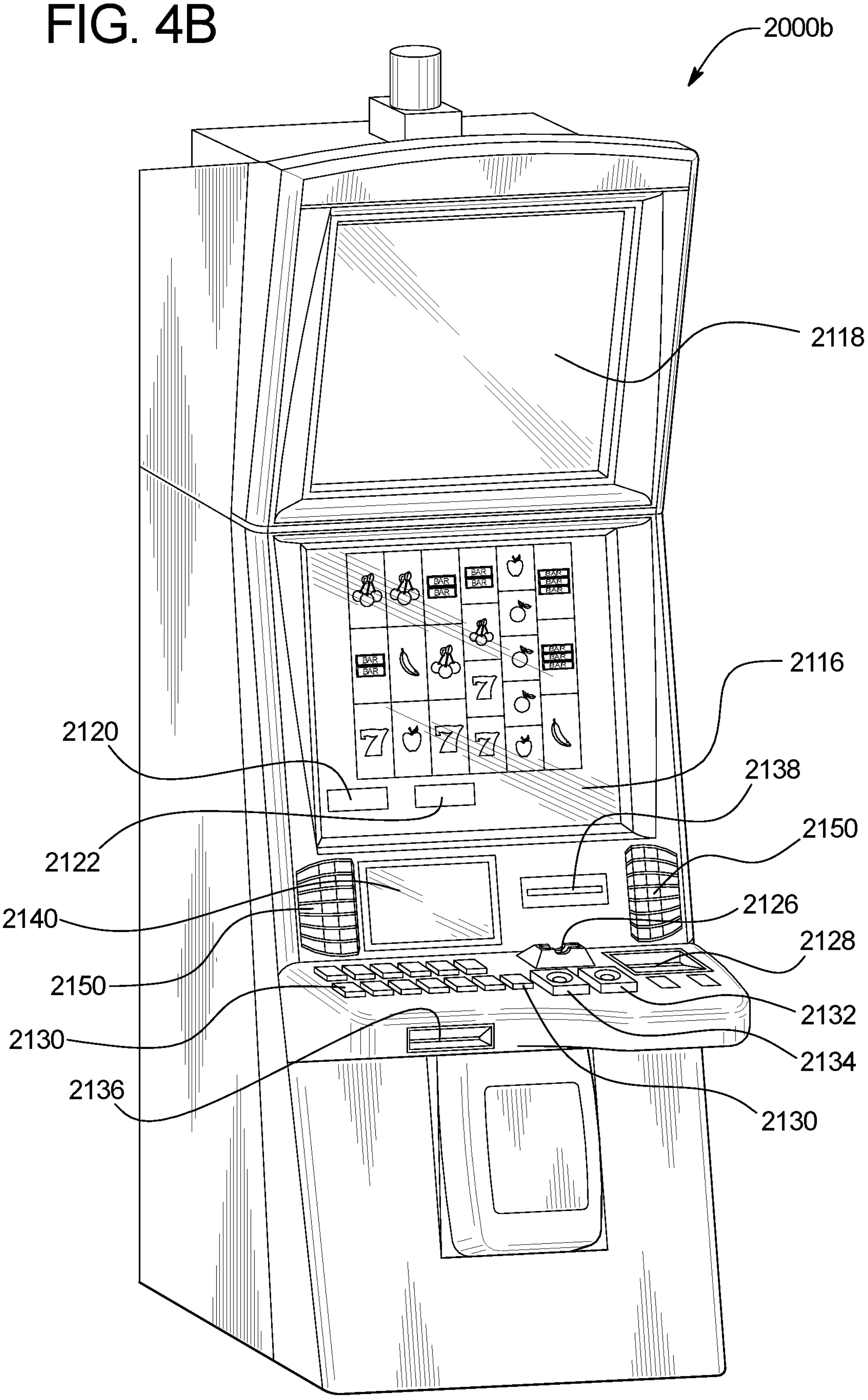
Figure 4C:
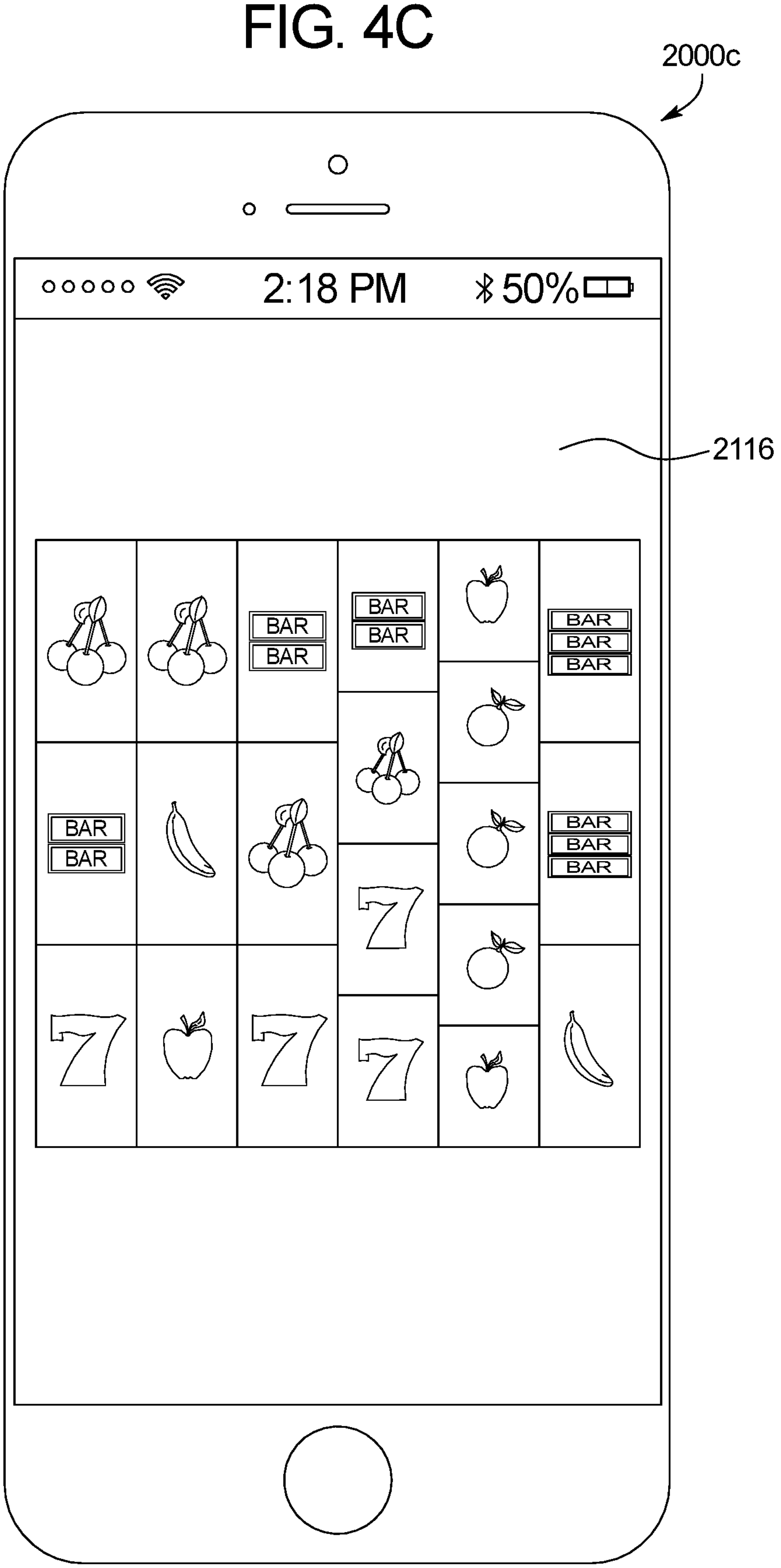
FIG. 4C is a front view of an example personal gaming device of the present disclosure.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electromechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a “BONUS” symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a “secondary game meter” configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A gaming system comprising:
- a processor; and
- a memory device that stores a plurality of instructions that, when executed by the processor, cause the processor to:
  - for a play of a first game:
    - randomly determine a quantity of symbol display positions associated with a plurality of reels,
    - determine, based on a ways to win symbol evaluation, any awards associated with any displayed symbol combinations comprising symbols displayed at the randomly determined quantity of symbol display positions, and
    - cause a display, by a display device, of any determined awards associated with any displayed symbol combinations, and
  - for a play of a second game:
    - assign a modifier to a first reel of the plurality of reels, the modifier being based on the randomly determined quantity of symbol display positions associated with that first reel,
    - responsive to an occurrence of a symbol modification event associated with any accumulated symbols displayed at any of the random quantity of symbol display positions associated with the first reel, modify, based on the modifier assigned to the first reel, any awards associated with any accumulated symbols displayed at any of the random quantity of symbol display positions associated with the first reel, and cause a display, by the display device, of any modified awards associated with any accumulated symbols.

2. The gaming system of claim 1, wherein the memory device stores a plurality of further instructions that, when executed by the processor for the play of the second game, cause the processor to assign a modifier to each of the plurality of reels, wherein for each reel, the modifier assigned to that reel is based on the randomly determined quantity of symbol display positions associated with that reel.

3. The gaming system of claim 2, wherein the memory device stores a plurality of further instructions that, when executed by the processor for the play of the second game and responsive to an occurrence of the symbol modification event associated with any accumulated symbols displayed at any of the random quantity of symbol display positions associated with any of the plurality of reels, cause the processor to modify, for each reel and based on the modifier assigned to that reel, any awards associated with any accumulated symbols displayed at any of the random quantity of symbol display positions associated with that reel.

4. The gaming system of claim 2, wherein different reels are assigned different modifiers based on different randomly determined quantities of symbol display positions associated with different reels.

5. The gaming system of claim 1, wherein the occurrence of the symbol modification event associated with any accumulated symbols displayed at any of the random quantity of symbol display positions associated with the first reel is based on a symbol being accumulated at each of the random quantity of symbol display positions associated with the first reel.

6. The gaming system of claim 1, wherein the occurrence of the symbol modification event associated with any accumulated symbols displayed at any of the random quantity of symbol display positions associated with the first reel is based on a symbol being accumulated at a plurality of, but not each of, the random quantity of symbol display positions associated with the first reel.

7. The gaming system of claim 1, wherein the random determination of the quantity of symbol display positions associated with the plurality of reels comprises a random determination of a quantity of symbol display positions for each reel.

8. The gaming system of claim 7, wherein different reels are associated with different probabilities of different quantities of symbol display positions.

9. The gaming system of claim 1, wherein at least two of the plurality of reels are each associated with a different quantity of symbol display positions.

10. The gaming system of claim 1, wherein different reels are associated with at least one of different maximum quantities of symbol display positions, and different minimum quantities of symbol display positions.

11. The gaming system of claim 1, wherein the ways to win symbol evaluation comprises:

determining if any of the random symbols displayed at any of the symbol display positions for a requisite number of the plurality of reels form a string of related symbols, wherein each formed string of related symbols includes one symbol for each reel and the requisite number of adjacent reels is at least two, determining if any formed strings of related symbols corresponds to any winning symbol combinations, and responsive to a formed string of related symbols corresponding to a winning symbol combination, determining an award associated with the winning symbol combination.

12. A gaming system comprising:

a processor; and a memory device that stores a plurality of instructions that, when executed by the processor, cause the processor to:

randomly determine a quantity of symbol display positions associated with a reel, for a play of a first game prior to an occurrence of a symbol accumulation sequence triggering event:

determine a first award based on first symbols displayed at the random quantity of symbol display positions associated with the reel, and cause a display, by a display device, of the first award, and for a play of a second game after the occurrence of the symbol accumulation sequence triggering event:

determine a second award based, at least in part, on an accumulation of second symbols at the randomly determined quantity of symbol display positions associated with the reel and a modifier based on the randomly determined quantity of symbol display positions associated with the reel, and cause a display, by the display device, of the second award.

13. The gaming system of claim 12, wherein the first award is based on a ways to win symbol evaluation.

14. The gaming system of claim 12, wherein the accumulated second symbols comprise the displayed first symbols.

15. The gaming system of claim 12, wherein the second award is based on any awards associated with the accumulated second symbols modified by the modifier.

16. A gaming system comprising:

a processor; and a memory device that stores a plurality of instructions that, when executed by the processor in association with a sequence comprising a plurality of plays of a game, cause the processor to:

cause a display, by a display device, of:

a symbol accumulated at a symbol display position associated with a reel, the symbol display position being one of a randomly determined quantity of symbol display positions associated with a plurality of reels, and an award associated with the symbol accumulated at the symbol display position, and responsive to an occurrence of a symbol modification event associated with the symbol accumulated at the symbol display position:

modify the award associated with the symbol based on a modifier assigned to the reel associated with that symbol display position, the modifier being based on the randomly determined quantity of symbol display positions associated with that reel, and cause a display, by the display device, of the modified award associated with the symbol accumulated at that symbol display position.

17. The gaming system of claim 16, wherein the occurrence of the symbol modification event is based on a symbol being accumulated at each of the random quantity of symbol display positions associated with that reel.

18. The gaming system of claim 17, wherein the memory device stores a plurality of further instructions that, when executed by the processor responsive to the occurrence of the symbol modification event, cause the processor to modify, based on the modifier assigned to that reel, the award associated with each of the symbols accumulated at each of the random quantity of symbol display positions associated with that reel.

19. The gaming system of claim 16, wherein the quantity of symbol display positions associated with the plurality of reels is randomly determined prior to the sequence.

20. The gaming system of claim 19, wherein the quantity of symbol display positions associated with the plurality of reels is randomly determined in association with a play of another game associated with a ways to win evaluation.

* * * * *